(12) United States Patent
Tanaka et al.

(10) Patent No.: US 10,679,329 B2
(45) Date of Patent: Jun. 9, 2020

(54) SIGNAL PROCESSING APPARATUS AND SIGNAL PROCESSING METHOD SETTING NOISE STRENGTH FOR STOCHASTIC RESONANCE PROCESSING

(71) Applicant: CANON KABUSHIKI KAISHA, Tokyo (JP)

(72) Inventors: Wakako Tanaka, Inagi (JP); Shinjiro Hori, Yokohama (JP); Tetsuya Suwa, Yokohama (JP); Tomokazu Ishikawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 15/458,386

(22) Filed: Mar. 14, 2017

(65) Prior Publication Data

US 2017/0287125 A1 Oct. 5, 2017

(30) Foreign Application Priority Data

Mar. 31, 2016 (JP) ................................ 2016-070798

(51) Int. Cl.
*G06K 9/00* (2006.01)
*G06T 7/00* (2017.01)
(Continued)

(52) U.S. Cl.
CPC ........ *G06T 7/0002* (2013.01); *G06K 9/00986* (2013.01); *G06K 9/036* (2013.01);
(Continued)

(58) Field of Classification Search
CPC combination set(s) only.
See application file for complete search history.

(56) References Cited

U.S. PATENT DOCUMENTS 9,287,962 B2 3/2016 Kasai et al.
2002/0005854 A1* 1/2002 Deering ................ G06T 15/005
345/596
(Continued)

FOREIGN PATENT DOCUMENTS

CN 104298878 A 1/2015
JP 2008-009549 A 1/2008
(Continued)

OTHER PUBLICATIONS

Bruno Ando, et al., "Stochastic Resonance, Theory and Applications", Univeristy of Catania, Catania, Italy, (2000) pp. 1-215.
(Continued)

*Primary Examiner* — Guillermo M Rivera-Martinez
(74) *Attorney, Agent, or Firm* — Venable LLP

(57) ABSTRACT

A signal processing apparatus includes an acquisition unit that acquires input data and detection target data, a noise strength setting unit that sets a noise strength K used to a predetermined stochastic resonance processing and a stochastic resonance processing unit that performs the predetermined stochastic resonance processing and outputs processed data. The predetermined stochastic resonance processing is a processing based on a formula in which processed data J(x) is represented by I(x), the noise strength K and the threshold value T and the processed data J(x) corresponds to a result in a case where M is infinite in the following formula, $$J(x) = \frac{1}{M}\sum_{m=1}^{M} j(x, m).$$

The noise strength setting unit sets the noise strength based on a function of a correlation coefficient between the result
(Continued)

of the predetermined stochastic resonance processing and the detection target data and the noise strength K.

28 Claims, 17 Drawing Sheets

(51) Int. Cl.
  *H04N 1/409* (2006.01)
  *H04N 1/50* (2006.01)
  *G06K 9/03* (2006.01)
  *G06K 9/62* (2006.01)

(52) U.S. Cl.
  CPC ........... *G06K 9/6212* (2013.01); *H04N 1/409* (2013.01); *H04N 1/504* (2013.01); *G06T 2207/10004* (2013.01); *G06T 2207/30168* (2013.01); *G06T 2207/30176* (2013.01)

(56) References Cited

U.S. PATENT DOCUMENTS

| | | | | |
|---|---|---|---|---|
| 2004/0111219 | A1* | 6/2004 | Gulati | B82Y 5/00 702/19 |
| 2006/0053005 | A1* | 3/2006 | Gulati | G06F 19/20 704/226 |
| 2006/0274151 | A1* | 12/2006 | Lueerssen | G01J 5/0003 348/180 |
| 2008/0077192 | A1* | 3/2008 | Harry | A61H 23/0263 607/48 |
| 2008/0180475 | A1* | 7/2008 | Eldar | H04N 1/405 347/13 |
| 2009/0034008 | A1* | 2/2009 | Croft | H04N 1/4051 358/3.19 |
| 2010/0020204 | A1* | 1/2010 | Fleischer | G01R 33/0029 348/241 |
| 2010/0091053 | A1 | 4/2010 | Jackson | |
| 2010/0169051 | A1* | 7/2010 | Peng | A61B 6/502 702/189 |
| 2012/0278039 | A1* | 11/2012 | Peng | A61B 6/502 702/181 |
| 2015/0207557 | A1* | 7/2015 | Kasai | H03F 1/26 375/349 |
| 2016/0019459 | A1* | 1/2016 | Audhkhasi | G06K 9/6217 706/22 |
| 2016/0279932 | A1* | 9/2016 | Kamiyanagi | B41J 2/04588 |

FOREIGN PATENT DOCUMENTS

| | | |
|---|---|---|
| JP | 2011-52991 A | 3/2011 |
| JP | 2012-175371 A | 9/2012 |
| JP | 2013-135244 A | 7/2013 |
| KR | 10-2001-0101951 | 11/2001 |
| WO | 00/46741 | 8/2000 |
| WO | 2009/138996 | 11/2009 |

OTHER PUBLICATIONS

European Search Report dated Jun. 16, 2017 in European Application No. 17160496.0.
J.J.Collins, et al., "Stochastic resonance without tuning", Nature, vol. 376, Jul. 20, 1995., pp. 236-238.
Korean decision to grant a patent dated Feb. 24, 2020 in corresponding Korean application No. 10-2017-0040413. (with English translation).

* cited by examiner

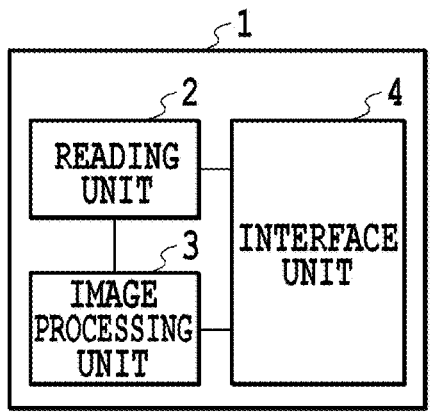
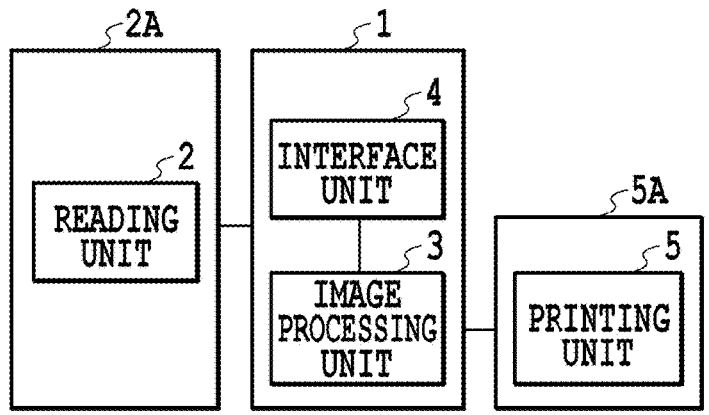
FIG.3A  FIG.3B
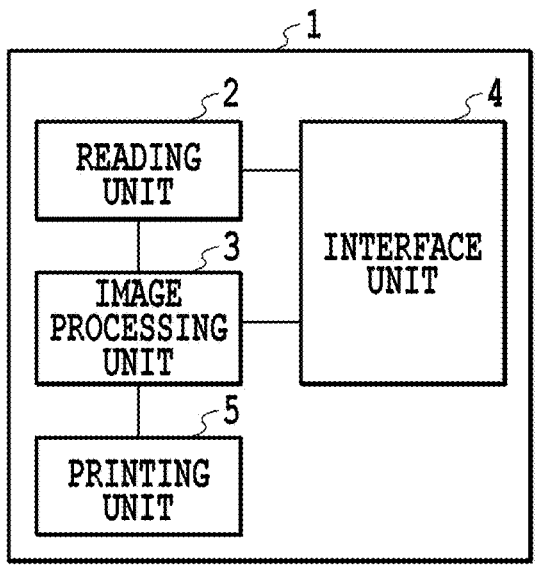
FIG.3C
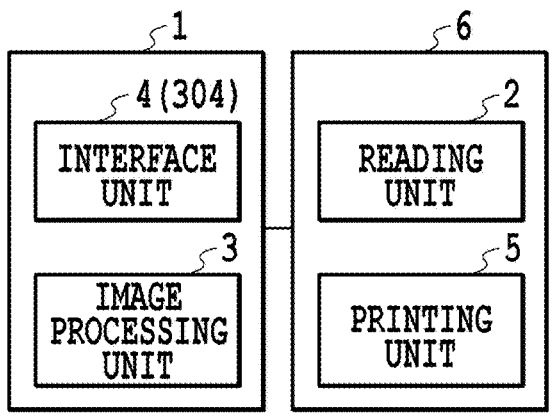
FIG.3D

SIGNAL PROCESSING APPARATUS AND SIGNAL PROCESSING METHOD SETTING NOISE STRENGTH FOR STOCHASTIC RESONANCE PROCESSING

BACKGROUND OF THE INVENTION

Field of the Invention

The present invention relates to a signal processing apparatus and a signal processing method by which a detection target signal is extracted from an input signal in which the detection target signal is buried in noise.

Description of the Related Art

In order to extract a detection target signal from an input signal buried in noise, a stochastic resonance phenomenon is useful. The stochastic resonance phenomenon is a phenomenon in which an input signal buried in noise is further added with noise and the resultant signal is subsequently subjected to nonlinear processing to thereby emphasize a detection target signal. However, in such a stochastic resonance phenomenon, a correlation coefficient used as an evaluation value showing the performance of the detection result changes depending on the strength of the added noise as shown in FIG. 1. In the case of FIG. 1, the correlation coefficient is maximum in a case where the added noise strength is 30. Specifically, the noise strength is desirably tuned because of the existence of the noise strength optimal for the realization of the maximum detection accuracy.

J. J. Collins, Carson C. Chow and Thomas T. Imhoff, "Stochastic resonance without tuning", NATURE, (UK), 20 Jul. 1995, vol. 376, pp. 236-238 (hereinafter referred to as Non-patent Document 1) discloses a configuration as shown in FIG. 2 in which the input signal I(x) is branched to a plurality of pieces and different noises are added to the respective pieces and the resultant pieces are subjected to a nonlinear processing to further synthesize the outputs thereof to thereby detect a detection target signal at a stable accuracy. Non-patent Document 1 describes that the increase of the branches allows the correlation coefficient to be stabilized regardless of the strength, which eliminates the peak as shown in FIG. 1, thus resulting in the elimination of the need to tune the noise strength. Japanese Patent Laid-Open No. 2013-135244 discloses a configuration in which independent noise generation sources as in Non-patent Document 1 are not prepared and noise generated by one noise generation source is added by being mutually delayed by a plurality of signal lines, thereby providing the same effect as that of Non-patent Document 1.

Japanese Patent Laid-Open No. 2011-52991 discloses a method to set a nonlinear function as a logistic function, a sigmoid function, or a hyperbolic tangent function to thereby increase the correlation coefficient within a wide noise strength range. In the case of Japanese Patent Laid-Open No. 2011-52991 as described above, there is no need to prepare a plurality of nonlinear circuits as in Non-patent Document 1 and Japanese Patent Laid-Open No. 2013-135244. Thus, an effect similar to those of the above publications can be realized by a simpler circuit.

In recent years, the extraction of a detection target signal using the stochastic resonance phenomenon as described above also may be used for a product inspection or the like. For example, a manufactured product can be imaged and predetermined noise is added to the resultant image data to subject the data to nonlinear processing, thereby extracting a singular portion such as a flaw existing in the product. Then, by providing such an extraction step, a step of pop-upping the extracted singular portion, and a step of allowing an inspector to confirm and finally determine a pop-upped image, the inspection time can be significantly reduced as compared with a case where the product is only determined through the visual inspection by the inspector, thereby improving the inspection accuracy. Furthermore, the application of the singular portion extraction mechanism as described above is not limited to the inspection step in a production site but can be used for a product itself. Specific examples include a function to image an image printed by a personal printer to automatically extract, if any, a defective portion.

However, the use of many nonlinear circuits as in Non-patent Document 1 and Japanese Patent Laid-Open No. 2013-135244 causes a risk of complicated processing or an apparatus having a higher price. Such a disadvantage can be solved by the use of the method disclosed in Japanese Patent Laid-Open No. 2011-52991 but may cause the unintended extraction of various singular portions that are actually not a flaw.

In order to detect an ejection failure of a printing head provided in an inkjet printing apparatus for example, a white stripe for example may be extracted from an image outputted from the inkjet printing apparatus. Thus, the feature thereof is obvious in advance. In the case of the conventional method, however, even singular portions having various features other than the white stripe are extracted in an unintended manner. Due to this, even in a case where the extraction step using the stochastic resonance phenomenon, the popup step, and the determination step as described above are prepared, many singular portions are popped up. Therefore, an increased burden is caused to the inspector, the inspection time cannot be reduced, and the inspection accuracy cannot be improved. That is, such a detection method is desired that can securely extract, if any, only a singular portion such as the white stripe whose feature is obvious in advance.

SUMMARY OF THE INVENTION

The present invention has been made in order to solve the above disadvantage. It is an objective of the invention to provide a signal processing apparatus and a signal processing method by which a detection target signal can be accurately and efficiently extracted from an input signal.

According to a first aspect of the present invention, there is provided a signal processing apparatus, comprising:

an acquisition unit configured to acquire input data having a plurality of input signals I(x) corresponding to a plurality of pixel position X respectively, and detection target data having detection target signals as a target to be detected;

a noise strength setting unit configured to set, based on the input data and the detection target data, a noise strength K used to subject the input signals I(x) to a predetermined stochastic resonance processing, the noise strength K showing the strength of noise added to the input signals I(x); and a stochastic resonance processing unit configured to use the noise strength K set by the noise strength setting unit and a threshold value T to quantize the input signals to subject the input signals I(x) to the predetermined stochastic resonance processing to output processed data, wherein:

the predetermined stochastic resonance processing is a processing based on a formula in which processed data J(x) is represented by I(x), the noise strength K and the threshold value T and the processed data J(x) corresponds to a result in a case where M is infinite in the following formula, $$J(x) = \frac{1}{M} \sum_{m=1}^{M} j(x, m)$$

j(x,m) being a result of a processing in which a value obtained by multiplying a random number noise N(x,m) of 1 to 0 by the noise strength K is added to the input signal I(x,m) and further binarized, M indicating the number of the processing among which the random number noises are different and m indicating one of the plurality processing the noise strength setting unit sets the noise strength K based on a function of a correlation coefficient and the noise strength K:

the correlation coefficient showing a correlation between the result of a case where each of the plurality of input signals I(x) is subjected to the predetermined stochastic resonance processing and the detection target data.

According to a second aspect of the present invention, there is provided a signal processing method, comprising:

an acquisition step of acquiring input data having a plurality of input signals I(x) corresponding to a plurality of pixel position X respectively, and detection target data having detection target signals as a target to be detected;

a noise strength setting step of setting, based on the input data and the detection target data, a noise strength K used to subject the input signals I(x) to a predetermined stochastic resonance processing, the noise strength K showing the strength of noise added to the input signals I(x); and a stochastic resonance processing step of using the noise strength K set by the noise strength setting step and a threshold value T to quantize the input signals to subject the input signals I(x) to the predetermined stochastic resonance processing to output processed data, wherein the predetermined stochastic resonance processing is a processing based on a formula in which processed data J(x) is represented by I(x), the noise strength K and the threshold value T and the processed data J(x) corresponds to a result in a case where M is infinite in the following formula, $$J(x) = \frac{1}{M} \sum_{m=1}^{M} j(x, m)$$

j(x,m) being a result of a processing in which a value obtained by multiplying a random number noise N(x,m) of 1 to 0 by the noise strength K is added to the input signal I(x,m) and further binarized, M indicating the number of the processing among which the random number noises are different and m indicating one of the plurality processing the noise strength setting step sets the noise strength K based on a function of a correlation coefficient and the noise strength K:

the correlation coefficient showing a correlation between the result of a case where each of the plurality of input signals I(x) is subjected to the predetermined stochastic resonance processing and the detection target data.

According to a third aspect of the present invention, there is provided a non-transitory computer-readable storage medium which stores a program for allowing a signal method to be executed by a computer, the signal processing method comprising:

an acquisition step of acquiring input data having a plurality of input signals I(x) corresponding to a plurality of pixel position X respectively, and detection target data having detection target signals as a target to be detected;

a noise strength setting step of setting, based on the input data and the detection target data, a noise strength K used to subject the input signals I(x) to a predetermined stochastic resonance processing, the noise strength K showing the strength of noise added to the input signals I(x); and a stochastic resonance processing step of using the noise strength K set by the noise strength setting step and a threshold value T to quantize the input signals to subject the input signals I(x) to the predetermined stochastic resonance processing to output processed data, wherein the predetermined stochastic resonance processing is a processing based on a formula in which processed data J(x) is represented by I(x), the noise strength K and the threshold value T and the processed data J(x) corresponds to a result in a case where M is infinite in the following formula, $$J(x) = \frac{1}{M} \sum_{m=1}^{M} j(x, m)$$

j(x,m) being a result of a processing in which a value obtained by multiplying a random number noise N(x,m) of 1 to 0 by the noise strength K is added to the input signal I(x,m) and further binarized, M indicating the number of the processing among which the random number noises are different and m indicating one of the plurality processing the noise strength setting step sets the noise strength K based on a function of a correlation coefficient and the noise strength K:

the correlation coefficient showing a correlation between the result of a case where each of the plurality of input signals I(x) is subjected to the predetermined stochastic resonance processing and the detection target data.

According to a fourth aspect of the present invention, there is provided a signal processing apparatus, comprising:

an acquisition unit configured to acquire input data having a plurality of input signals corresponding to a plurality of pixel position X respectively, and detection target data having detection target signals as a target to be detected;

a noise strength setting unit configured to set, based on the input data and the detection target data, a noise strength used to subject the input signals to a predetermined stochastic resonance processing, the noise strength showing the strength of noise added to the input signals; and a stochastic resonance processing unit configured to use the noise strength set by the noise strength setting unit and a threshold value to quantize the input signals to subject the input signals to the predetermined stochastic resonance processing to output processed data, wherein the predetermined stochastic resonance processing is a processing for outputting, in a method of adding noises to the input signal to perform binarization processing steps in a parallel manner to synthesize the results, a value corresponding to a value obtained when the parallel number is infinite, and the noise strength setting unit sets the noise strength based on a function of a correlation coefficient showing a correlation between the result of a case where each of the plurality of input signals are subjected to the predetermined stochastic resonance processing and the detection target data and the noise strength.

Further features of the present invention will become apparent from the following description of exemplary embodiments (with reference to the attached drawings).

BRIEF DESCRIPTION OF THE DRAWINGS

FIGS. 3A to 3D show an embodiment of an image processing apparatus that can be used in the present invention;

FIGS. 10A and 10B illustrate the result of a stochastic resonance processing;

FIGS. 16A to 16E illustrate five types of pieces of detection target data having different phases.

DESCRIPTION OF THE EMBODIMENTS

Figure 1:
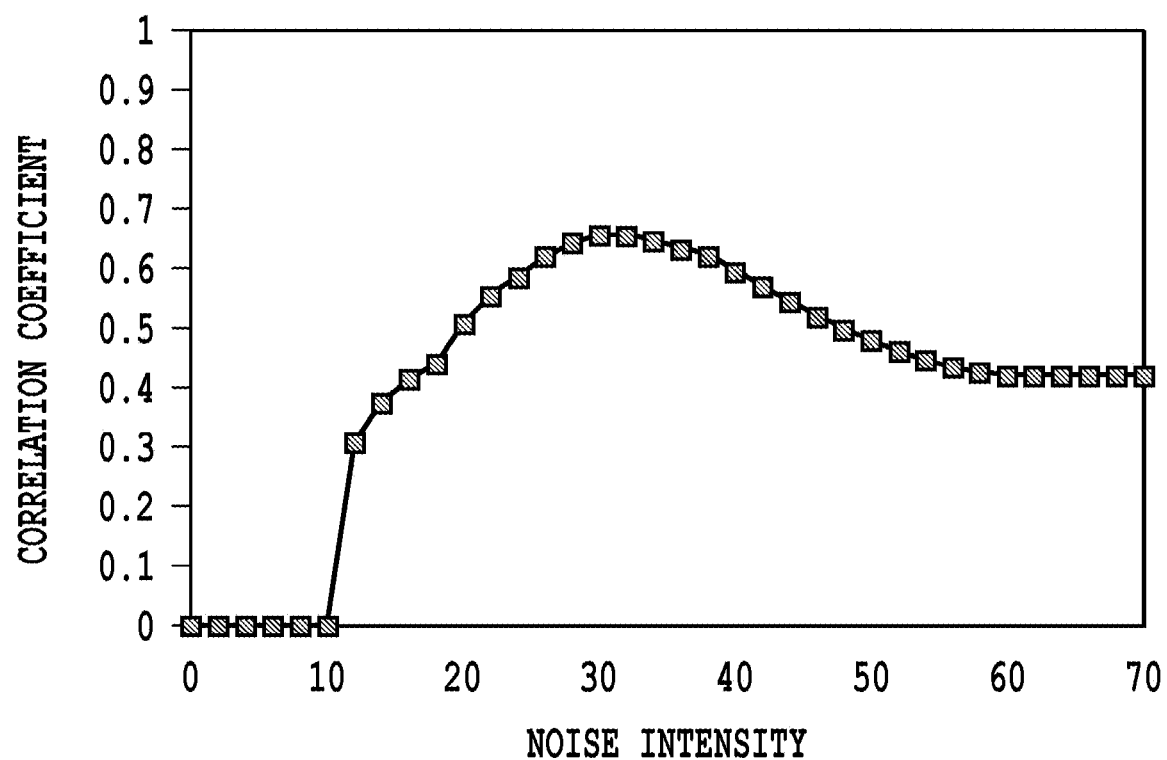
FIG. 1 illustrates the relation between an added noise strength and a correlation coefficient in a stochastic resonance processing.

FIGS. 3A to 3D illustrate the embodiment of an image processing apparatus 1 that can be used as a signal extraction processing apparatus of the present invention. The image processing apparatus of the present invention is used to subject image data to popup processing to allow a user to more easily recognize the white stripe in a printed image for example or processing for the determination by the apparatus itself. The image processing apparatus of the present invention can take various system forms.

FIG. 3A illustrates an embodiment in which the image processing apparatus 1 includes a reading unit 2. For example, this corresponds to a case where a sheet on which a predetermined image is printed by the inkjet printing apparatus is placed on the reading base of the reading unit 2 in the image processing apparatus 1 and is imaged by an optical sensor for example and the image data is processed by an image processing unit 3. The image processing unit 3 includes a CPU or an image processing accelerator providing processing having a higher speed than that of the CPU and controls the reading operation by the reading unit 2 and subjects received image data to predetermined inspection processing.

FIG. 3B illustrates an embodiment in which the image processing apparatus 1 is externally connected to a reading apparatus 2A including the reading unit 2. For example, this corresponds to a system in which a scanner is connected to a PC for example. A general connection method such as USB, GigE, or CameraLink may be used. The image data read by the reading unit 2 is provided via an interface 4 to the image processing unit 3. The image processing unit subjects the received image data to a predetermined inspection processing. In this case, the image processing apparatus 1 may be further externally connected to a printing apparatus 5A including a printing unit 5.

FIG. 3C illustrates an embodiment in which the image processing apparatus 1 includes the reading unit 2 and the printing unit 5. This corresponds to a complex machine including a scanner function, a printer function, and an image processing function for example. The image processing unit 3 controls all operations such as the printing operation in the printing unit 5, the reading operation in the reading unit 2, and the inspection processing to an image read by the reading unit 2.

FIG. 3D illustrates an embodiment in which a complex machine 6 including the reading unit 2 and the printing unit 5 is externally connected to the image processing apparatus 1. This corresponds to a system in which a complex machine including both of a scanner function and a printer function is connected to a PC for example. The image processing apparatus 1 of the present invention also can take any of the forms shown in FIGS. 3A to 3D. However, the following section will describe the image inspection apparatus using the embodiment of FIG. 3D.

First Embodiment

Figure 4:
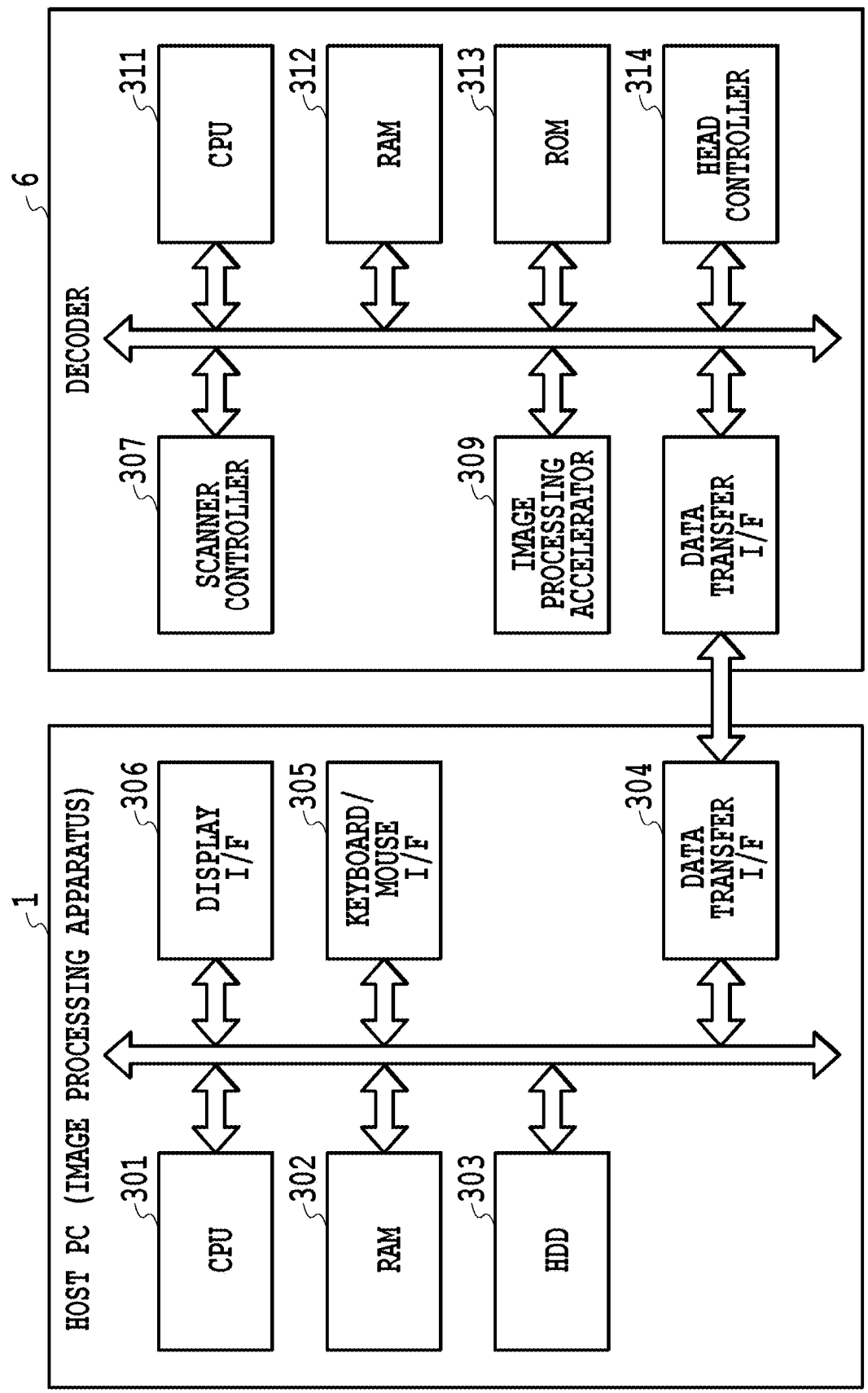
FIG. 4 is a block diagram to explain the configuration of the control in the first embodiment.

FIG. 4 is a block diagram for explaining the control configuration in the embodiment of FIG. 3D. The image processing apparatus 1 as a signal extraction processing apparatus consists of a host PC for example. A CPU 301 executes various kinds of processing while using a RAM 302 as a work area in accordance with a program stored in an HDD 303. For example, the CPU 301 generates image data that can be printed by the complex machine 6 based on a command received from a user via a keyboard/mouse I/F 305 or a program stored in the HDD 303 and transfers this to the complex machine 6. The CPU 301 subjects the image data received from the complex machine 6 via a data transfer I/F 304 to predetermined processing based on the program stored in the HDD to display the result or various pieces of information on a not-shown display via a display I/F 306. Image data I(x), which is a target of the stochastic resonance processing of this embodiment as described later, is received from the complex machine 6 via the data transfer I/F 304.

On the other hand, in the complex machine 6, a CPU 311 executes various kinds of processing while using a RAM 312 as a work area based on a program stored in a ROM 313. The complex machine 6 includes an image processing accelerator 309 for performing high-speed image processing, a scanner controller 307 for controlling the reading unit 2, and a head controller 314 for controlling the printing unit 5.

The image processing accelerator 309 is hardware that can execute image processing at a higher speed than the CPU 311. The image processing accelerator 309 is activated by allowing the CPU 311 to write parameters and data required for the image processing to the predetermined address of the RAM 312. After reading the above parameters and data, the image processing accelerator 309 subjects the data to predetermined image processing. However, the image processing accelerator 309 is not an indispensable element. Thus, similar processing can be executed by the CPU 311.

The head controller 314 supplies printing data to a printing head 100 provided in the printing unit 5 and controls the printing operation of the printing head 100. The head controller 314 is activated by allowing the CPU 311 to write printing data that can be printed by the printing head 100 and control parameters to a predetermined address of the RAM 312 and executes the ejecting operation based on the printing data.

The scanner controller 307 outputs, while controlling the individual reading elements arranged in the reading unit 2, RGB brightness data obtained therefrom to the CPU 311. The CPU 311 transfers the resultant RGB brightness data via the data transfer I/F 310 to the image processing apparatus 1. The data transfer I/F 304 of the image processing apparatus 1 and the data transfer I/F 310 of the complex machine 6 can be connected by a USB, IEEE1394, or LAN for example.

Figure 5:
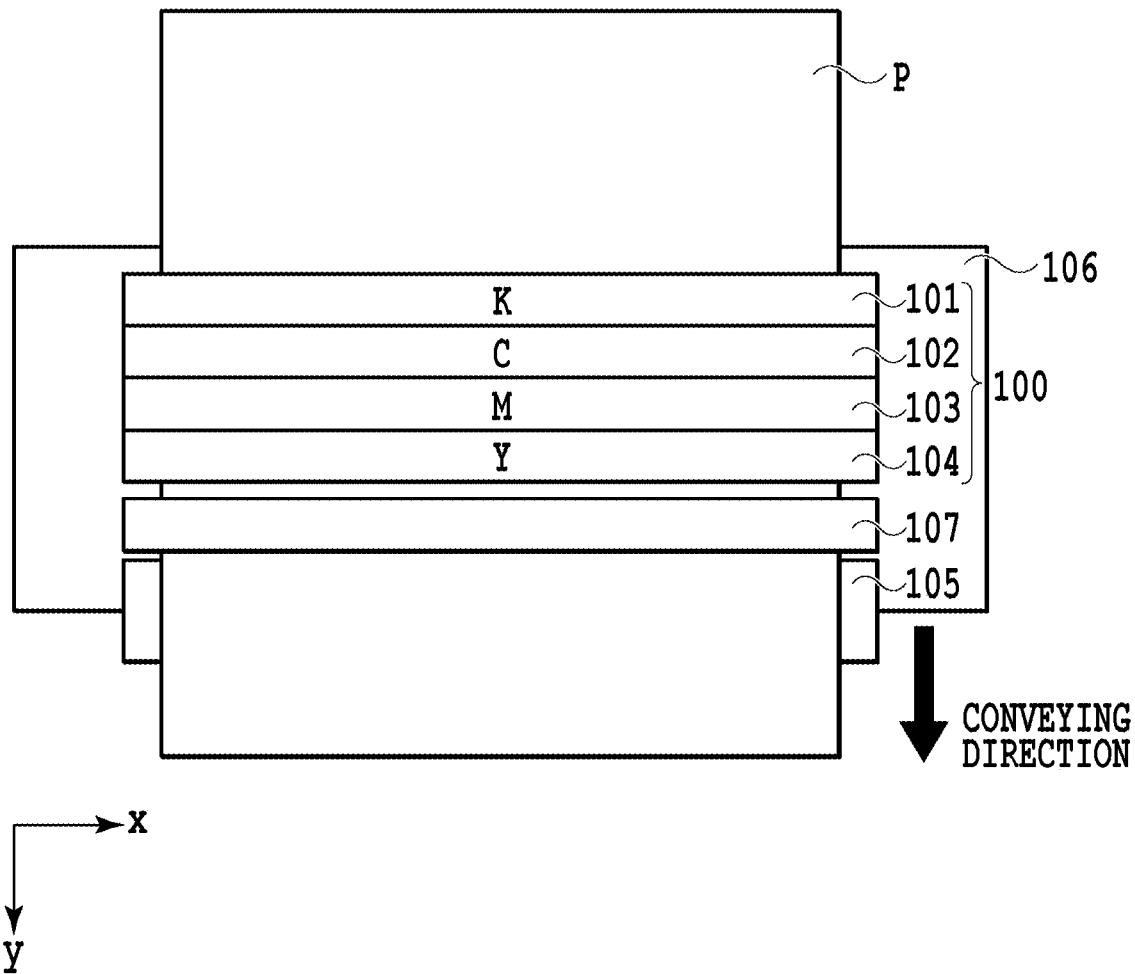
FIG. 5 is a schematic view illustrating the configuration of an inkjet printing apparatus.

FIG. 5 is a schematic view illustrating the configuration of an inkjet printing apparatus that can be used as the complex machine 6 of this embodiment (hereinafter also may be simply referred to as a printing apparatus). The printing apparatus of this embodiment is a full line-type printing apparatus in which the printing head 100 and the reading head 107, that have a width similar to a width of the sheet P that may be a printing medium or an inspection target, are parallelly arranged in a Y direction. The printing head 100 includes four printing element columns 101 to 104 which eject inks of black (K), cyan (c), magenta (M), and yellow (Y) respectively. These printing element columns 101 to 104 are parallelly arranged in a conveying direction of the sheet P (Y direction). At a further downstream of the printing element columns 101 to 104, the reading head 107 is provided. The reading head 107 includes therein a plurality of reading elements for reading a printed image arranged in the X direction.

In order to perform printing processing or reading processing, the sheet P is conveyed at a predetermined speed in accordance with the rotation of a conveying roller 105 in the Y direction of the drawing. During this conveyance, the printing processing by the printing head 100 or the reading processing by the reading head 107 is performed. The sheet P at a position at which the printing processing by the printing head 100 or the reading processing by the reading head 107 is performed is supported from the lower side by a platen 106 consisting of a flat plate to thereby maintain the distance from the printing head 100 or the reading head 107 and the smoothness.

Figure 6A:
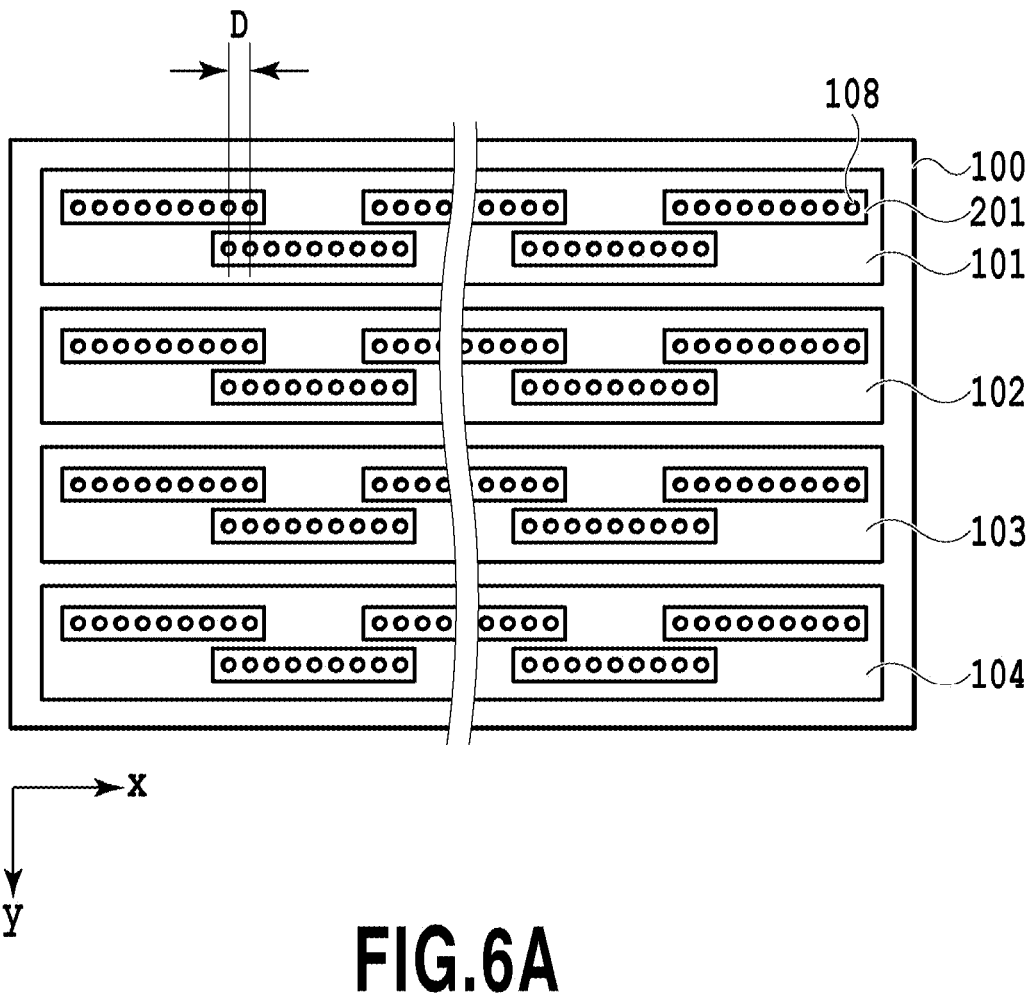
FIGS. 6A and 6B illustrate the arrangement configuration of printing elements of a printing head and reading elements of a reading head.
Figure 6B:
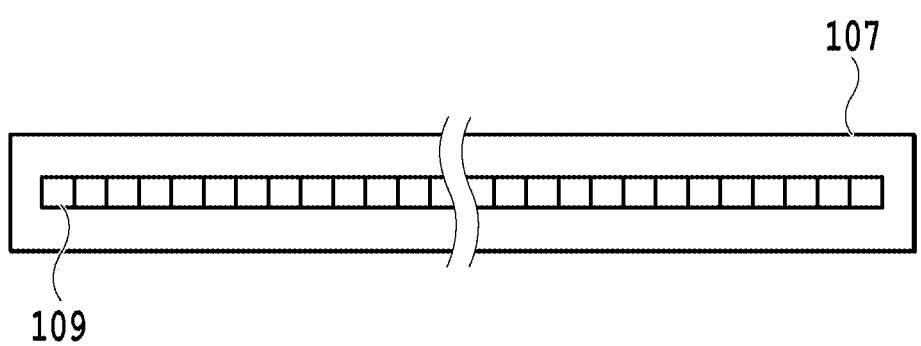

FIGS. 6A and 6B illustrate the arrangement configuration of printing elements in the printing head 100 and the arrangement configuration of reading elements in the reading head 107. In the printing head 100, the printing element columns 101 to 104 corresponding to the respective ink colors are configured so that a plurality of printing element substrates 201 in which a plurality of printing elements 108 are arranged at a fixed pitch are alternately arranged in the Y direction so as to be continuous in the X direction while having the overlap region D. To the sheet P conveyed at a fixed speed in the Y direction, ink is ejected from the individual printing elements 108 based on the printing data at a fixed frequency, thereby printing an image having the resolution corresponding to the arrangement pitch of the printing element 108 onto the sheet P. However, the printing elements 108 are arranged in an individual printing head with a very-high density. Thus, there is a risk where a white stripe caused by an error in a case where the printing head 100 is manufactured tends to be arised in the overlap region D in particular.

On the other hand, the reading head 107 includes a plurality of reading sensors 109 arranged at a predetermined pitch in the X direction. Although not shown, the individual reading sensors 109 consists of a plurality of reading elements that may be the minimum unit of a reading pixel and are arranged in the X direction. The image on the sheet P conveyed at a fixed speed in the Y direction can be imaged by the reading elements of the individual reading sensor 109 at a predetermined frequency to thereby read the entire image printed on the sheet P at an arrangement pitch of the reading elements.

The following section will specifically describe the singular portion detection algorithm in this embodiment. The singular portion detection algorithm of this embodiment is an algorithm to image an already-printed image to use a stochastic resonance processing to accurately detect, in the resultant image data, a singular portion such as a white stripe or a black stripe appearing at a specific position such as an overlap region. This embodiment is not limited to an inkjet printing apparatus as the complex machine 6. However, the following description will be made based on an assumption that an image printed by the printing head 100 of the complex machine 6 is read by the reading head 107 of the same complex machine. First, the following section will describe the stochastic resonance processing used in this embodiment.

Reference is made again to FIG. 2 illustrating the concept of the processing using the stochastic resonance phenomenon also disclosed in Non-patent Document 1. An input signal I(x) shows a signal value corresponding to the individual pixel read by a reading sensor 109. x shows the pixel position. The input signal I(x) is branched to M pieces and the respective pieces are added with different noises N(x, m)×K. m is a parameter showing one of M branch paths and is an integer in the range from 1 to M. N(x,m) shows a random number corresponding to the branch path m of the pixel position x and has the range from 0 to 1. The value N(x,m)×K obtained by multiplying the random number N(x,m) by the noise strength K as an integer is added to the input signal I(x). Specifically, assuming that the signal value after the addition of noise is i(x,m), then the following formula can be obtained.

$$i(x,m) = I(x) + N(x,m) \times K \quad \text{(Formula 1)}$$

By comparing the signal value i(x,m) after the noise addition with a predetermined threshold value T, nonlinear processing (binary processing) is performed to thereby obtain a binary signal j(x,m). Specifically, the following is established.

$$i(x,m) \geq T \rightarrow j(x,m) = 1$$

$$i(x,m) < T \rightarrow j(x,m) = 0 \quad \text{(Formula 2)}$$

Thereafter, M binary signals j(x,m) are synthesized and subjected to average processing. The resultant value is set as the signal value J after the stochastic resonance. That is, the following is established.

$$J(x) = \frac{1}{M}\sum_{m=1}^{M} j(x, m) \quad \text{(Formula 3)}$$

Figure 2:
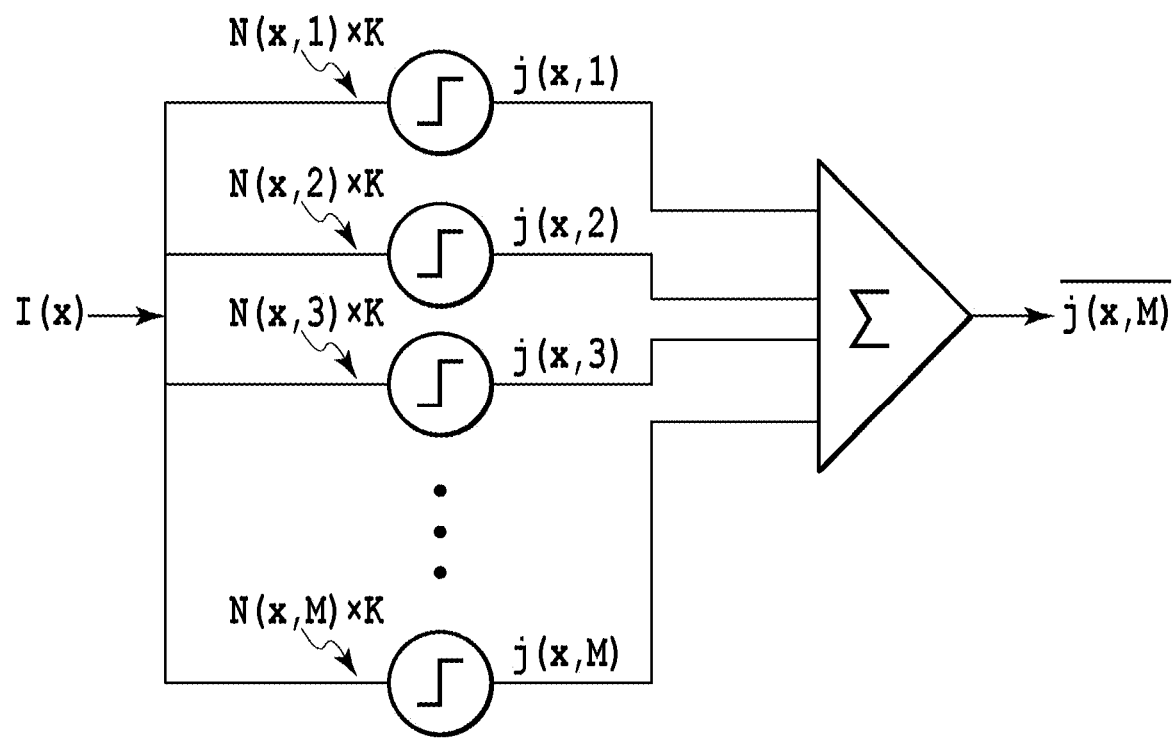
FIG. 2 illustrates the stochastic resonance processing in Non-patent Document 1.

According to Non-patent Document 1, the higher value M is preferred. An increase of the value M allows the signal value J(x) to be closer to a value showing the probability at which the input signal value I(x) of each pixel exceeds the binary threshold value T in the nonlinear processing. In other words, deriving a formula for calculating the probability at which the input signal value I(x) exceeds the binary threshold value T allows, without requiring many noise addition processing operations or nonlinear processing operations as shown in FIG. 2, detection processing equivalent thereto. Thus, the following section will describe the probability at which the input signal value I(x) exceeds the binary threshold value T.

Figure 7A:
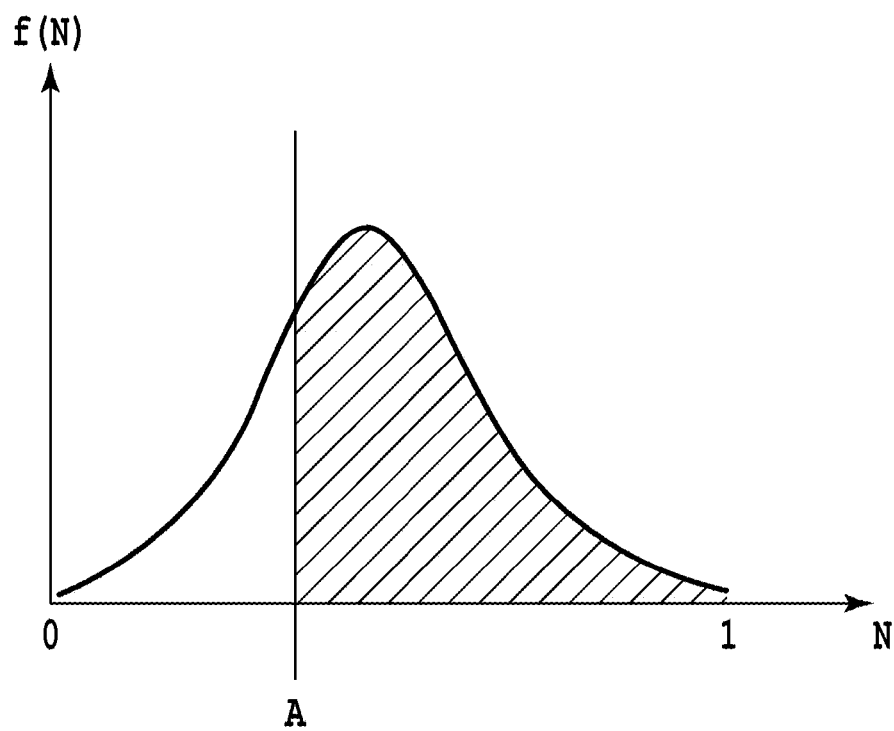
FIGS. 7A and 7B illustrate a histogram of the random number generation.
Figure 7B:
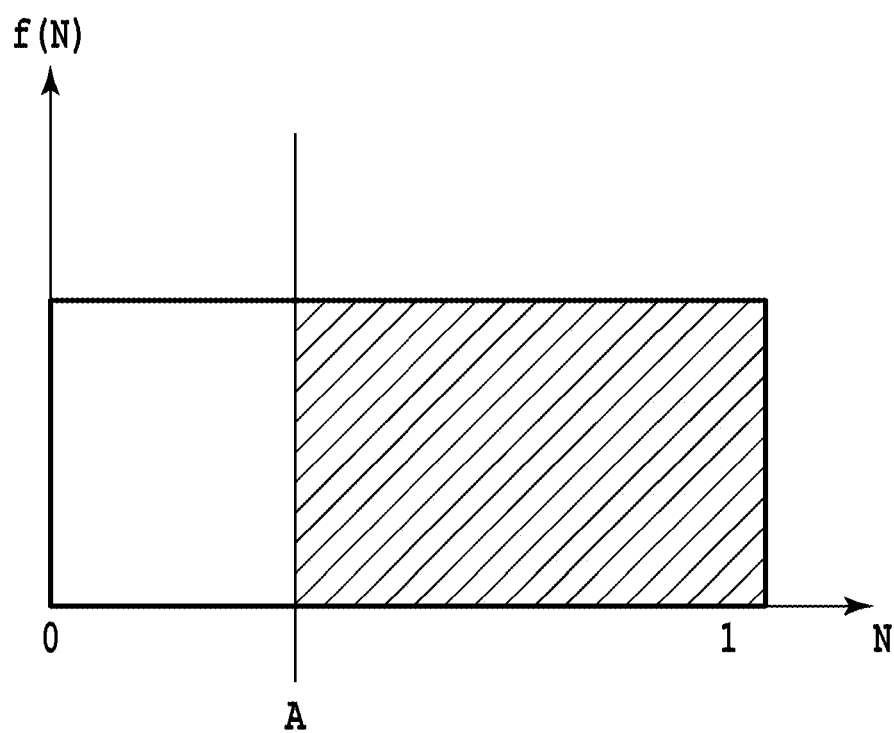

FIGS. 7A and 7B illustrate a histogram that is convergent in a case where infinity many random numbers N are generated. The horizontal axis shows the random number N in the range from 0 to 1. The vertical axis shows the probability f(N) at which each value N occurs. FIG. 7A illustrates a case where the average value is 0.5 and the normal distribution based on $3\sigma=1$ is used and FIG. 7B illustrates a case where the random number N in the range of 0 to 1 is generated at the same frequency (so-called white noise). The following description will be made based on the assumption that the random number N is generated based on such a distribution.

According to the Formula 1 and Formula 2, the probability at which the result after the binarization of the individual pixel is j(x,m)=1 is equal to the probability at which:

$I(x)+N(x,m)\times K \geq T$ is established.

Assuming that K(strength) has a positive value, then the above formula can be expressed as:

$$N(x,m) \geq \{T-I(x)\}/K \quad \text{(Formula 4)}$$

Assuming that the right side is A, then the following formula can be established.

$$N(x,m) \geq A \quad \text{(Formula 5)}$$

The probability at which the result of the individual pixel after the binarization j(x,m) is j(x,m)=1 (i.e., the signal value J(x) after the stochastic resonance processing) is a probability that the Formula 5 is satisfied. In the respective diagrams of FIGS. 7A and 7B, the areas of the shaded areas correspond to this probability and can be represented by the following formula.

$$J(x) = \begin{cases} 1 & A < 0 \\ 0 & A > 1 \\ 1 - \int_{N=0}^{A} f(N)dN & 0 \leq A \leq 1 \end{cases} \quad \text{(Formula 6)}$$

In the case where the histogram for the generation of the random number N has a normal distribution as shown in FIG. 7A, then the Formula 6 is represented as shown below.

$$J(x) = \begin{cases} 1 & A < 0 \\ 0 & A > 1 \\ 1 - \dfrac{1}{1+\exp\{-\alpha(A-0.5)\}} & 0 \leq A \leq 1 \end{cases}$$

In a case where the histogram for the noise N has the normal distribution of $\pm 3\sigma=1$ as shown in FIG. 7A, then the coefficient $\alpha$ is about $\alpha=10.8$. In a case where the constant A is returned to the original formula $\{T-I(x,m)\}/K$, then the Formula 7 is represented as shown below.

$$J(x) = \begin{cases} 1 & T < I(x) \\ 0 & I(x) < T - K \\ 1 - \dfrac{1}{1+\exp\left\{-\alpha\left(\frac{(T-I(x))}{K} - 0.5\right)\right\}} & T-K \leq I(x) \leq T \end{cases} \quad \text{(Formula 7)}$$

In a case where the histogram for the generation of the random number N is as shown in FIG. 7B on the other hand, then the Formula 6 can be represented as shown below.

$$J(x) = \begin{cases} 1 & A < 0 \\ 0 & A > 1 \\ 1 - A & 0 \leq A \leq 1 \end{cases}$$

In a case where the constant A is returned to the original formula $\{T-I(x)\}/K$, the Formula 8 is represented as shown below.

$$J(x) = \begin{cases} 1 & T < I(x) \\ 0 & I(x) < T - K \\ 1 - (T - I(x))/K & T - K \leq I(x) \leq T \end{cases} \quad \text{(Formula 8)}$$

Figure 8A:
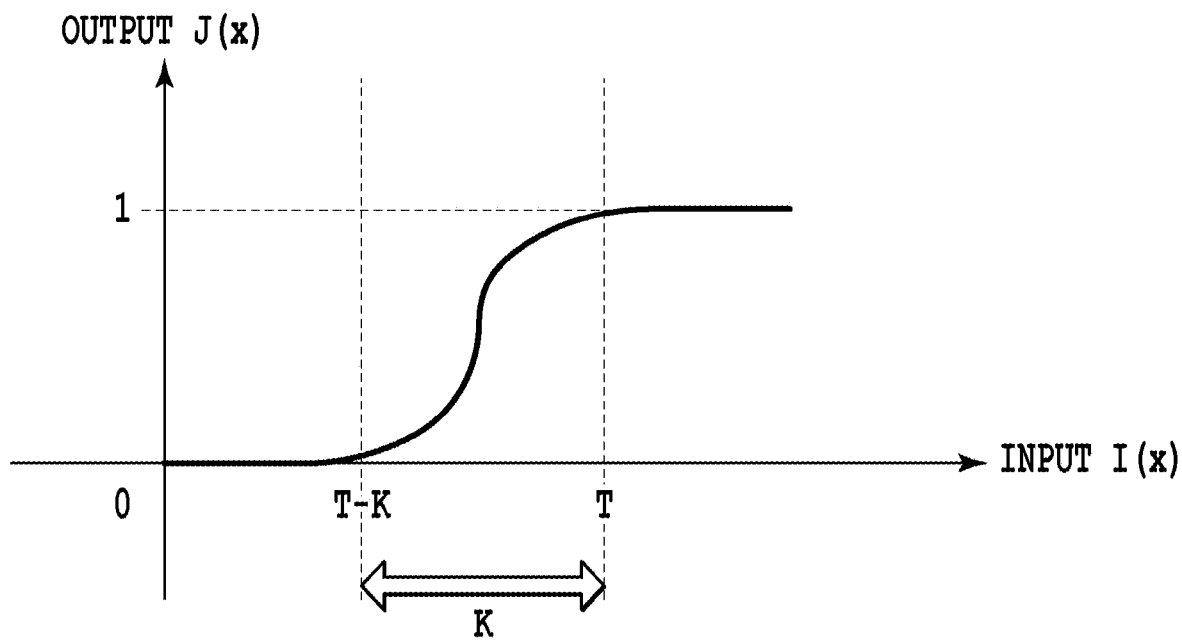
FIGS. 8A and 8B illustrate the Formula 7 and the Formula 8 by graphs.
Figure 8B:
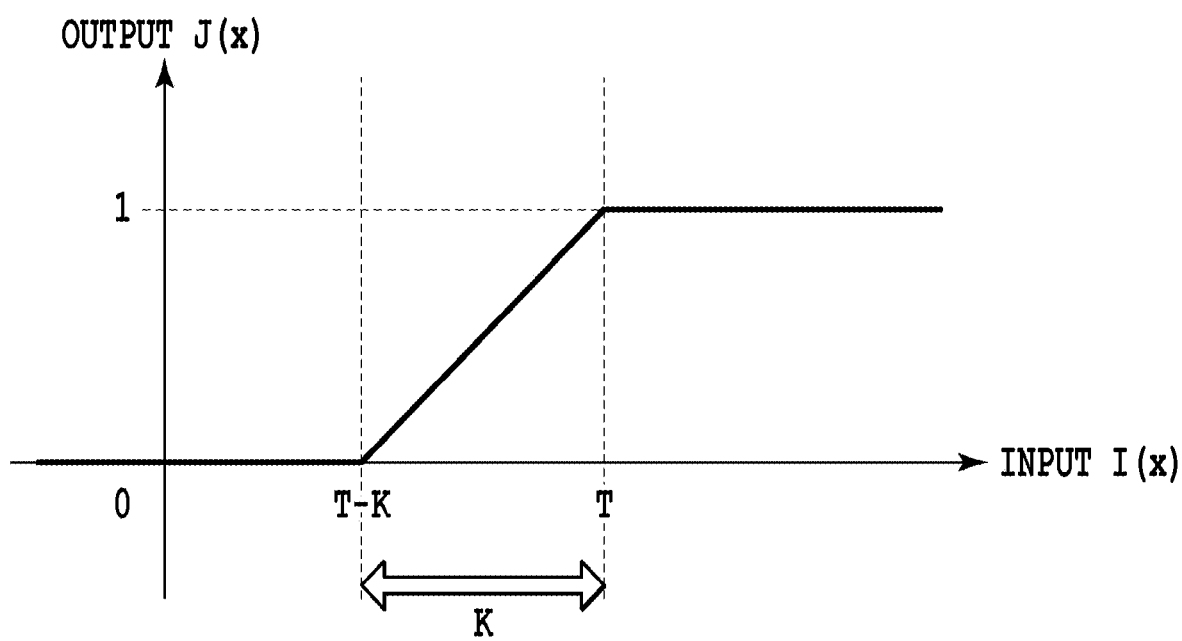

FIGS. 8A and 8B illustrate the Formula 7 and Formula 8 by graphs. By using the Formula 7 or Formula 8 under appropriate noise strength K and threshold value T, a singular portion can be extracted at such an accuracy that is the same as an accuracy at which the method of Non-patent Document 1 is used to set a branch number M to the input signal value I(x) at infinity.

Next, the following section will describe a method of setting a threshold value for the stochastic resonance processing in order to set an appropriate noise strength K (i.e., an upper limit value) and the threshold value T. This embodiment has a purpose of detecting the existence of a white stripe, if any, in the overlap region D in the inkjet printing apparatus described with reference to FIG. 5 and FIGS. 6A and 6B. Such a white stripe is detected by allowing the printing head 100 to print a uniform image to read the printed image by the reading head 107. Specifically, such a white stripe is assumed as a detection target and the noise strength K and the threshold value T are set in order to accurately detect the white stripe by the stochastic resonance processing.

Figures 9A, 9B, 9C:
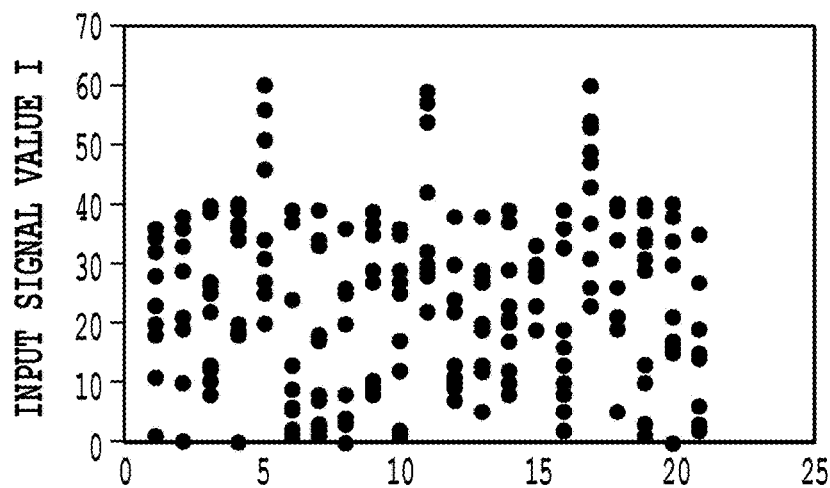
FIGS. 9A to 9C illustrate detection target data and reading data.

FIGS. 9A to 9C illustrate the correspondence of positions in the direction X to the detection target data in a case where the white stripe exists at a predetermined position, the result of allowing the reading head 107 to read an actual image in which the white stripe exists at a predetermined position, and the result of reading the respective pixels. FIG. 9A illustrates that white pixels show such pixels that correspond to a white stripe while gray pixels show such pixels that do not correspond to the white stripe in the individual pixels in the two-dimensional arrangement, respectively.

FIG. 9B illustrates the input data of the reading result of the reading head 107 (hereinafter referred to reading data). Specifically, the result of quantizing an analog signal received by an individual reading element to 8 bits (256 value) is shown as a brightness value. A high brightness value shows that the image has higher lightness, i.e., a higher possibility of a white stripe. FIG. 9C is a graph obtained by plotting the correspondence of positions in the X direction to the brightness values of the respective pixels. It can be seen that pixels positioned at the white stripes have a brightness value relatively higher than those of other regions. Judging from this drawing, pixels positioned at the white stripes have a brightness value of 20 that is buried in noises having a value of 40. In order to accurately extract white stripes in this embodiment, raw reading data as shown in FIG. 9B is desirably subjected to predetermined stochastic resonance processing to thereby obtain such a result that is as similar as possible to the detection target data of FIG. 9A.

Figures 10A, 10B:
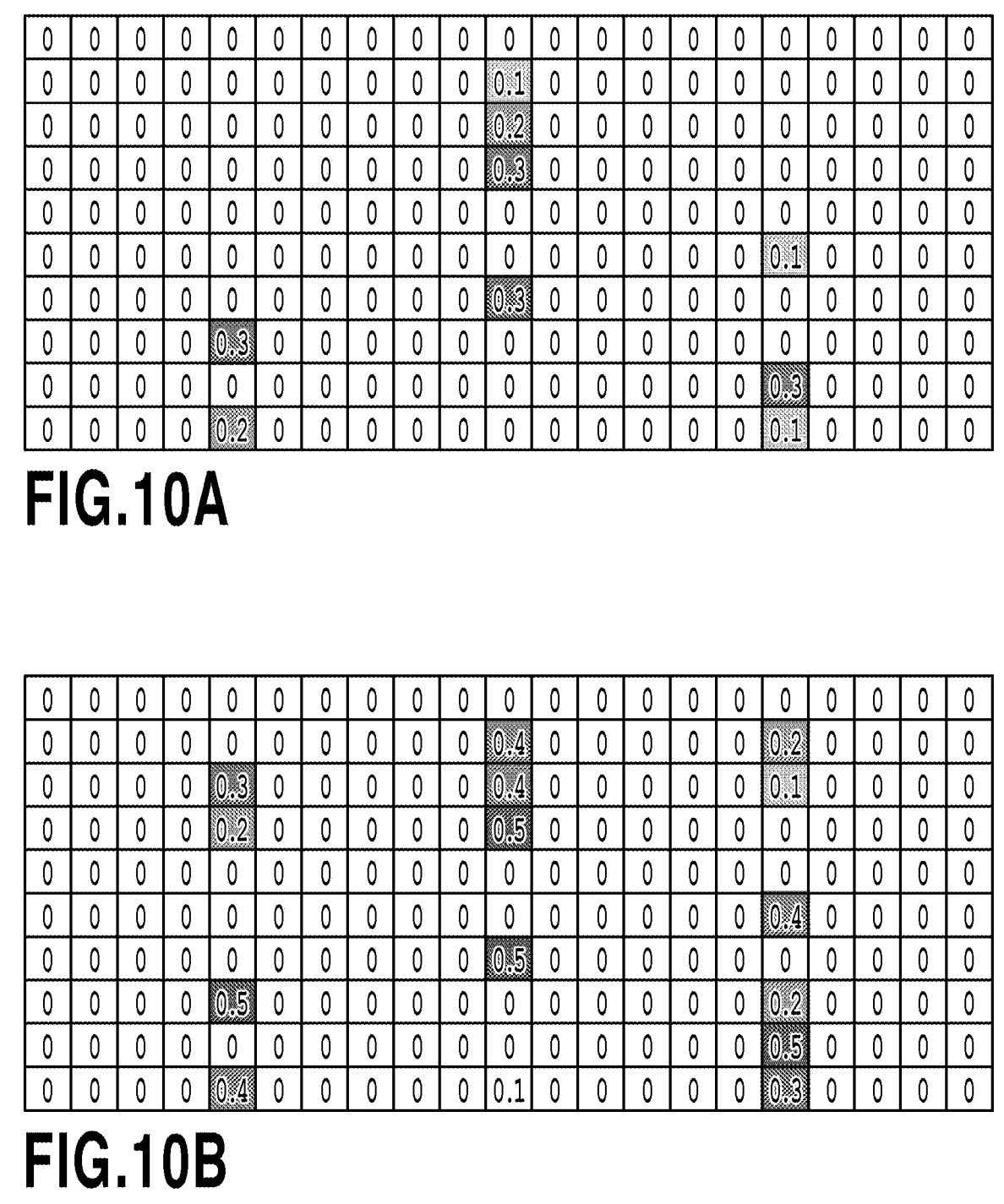

FIGS. 10A and 10B illustrate the result $J(x)$ of subjecting FIG. 9B to the stochastic resonance processing assuming the white noise shown in the Formula 8. FIG. 10A illustrates a case where the noise strength K=30 and the binary threshold value T=80 are used. FIG. 10B illustrates a case where the noise strength K=40 and the binary threshold value T=80 are used. Comparing FIGS. 10A and 10B, correlation coefficients of FIG. 10B with respect to the data of the white stripe position shown in FIG. 9A are closer to 1 than that of FIG. 10A, and a correlation of FIG. 10B with respect to the detection target data is higher than that of FIG. 10A. That is, the correlation with respect to the detection target data depends on the noise strength K.

Here, a correlation coefficient C is defined that shows the correlation with respect to the detection target data in the entire image. In this embodiment, the correlation coefficient C is a detection performance evaluation value showing the correlation level between the detection target data shown in FIG. 9A and the result after the stochastic resonance processing shown in FIGS. 10A and 10B. The correlation coefficient C can be represented by the following Formula 9.

$$C = \frac{\sum_{x=1}^{L}(t(x)-\bar{t})(J(x)-\bar{J})}{\sqrt{\sum_{x=1}^{L}(t(x)-\bar{t})^2}\sqrt{\sum_{i=1}^{L}(J(x)-\bar{J})^2}}$$ (Formula 9)

In the formula, L denotes the number of pixels and L=210 is established in this example. $t(x)$ shows a detection target signal shown in FIG. 9A, $J(x)$ shows a signal after the predetermined stochastic resonance processing, $t$ shows an arithmetic mean value of $t(x)$, and $J$ shows an arithmetic mean value of $J(x)$. The correlation coefficient C shows an evaluation value that is closer to 1 in a case where two signal groups as a comparison target have a higher correlation and that is closer to 0 in a case where the correlation is lower. Specifically, the correlation coefficient C closer to 1 shows that the entire image has the output signal $J(x)$ after the stochastic resonance processing closer to the detection target signal $t(x)$. The correlation coefficient C of FIG. 10A with respect to FIG. 9A is about 0.49.

Figure 11A:
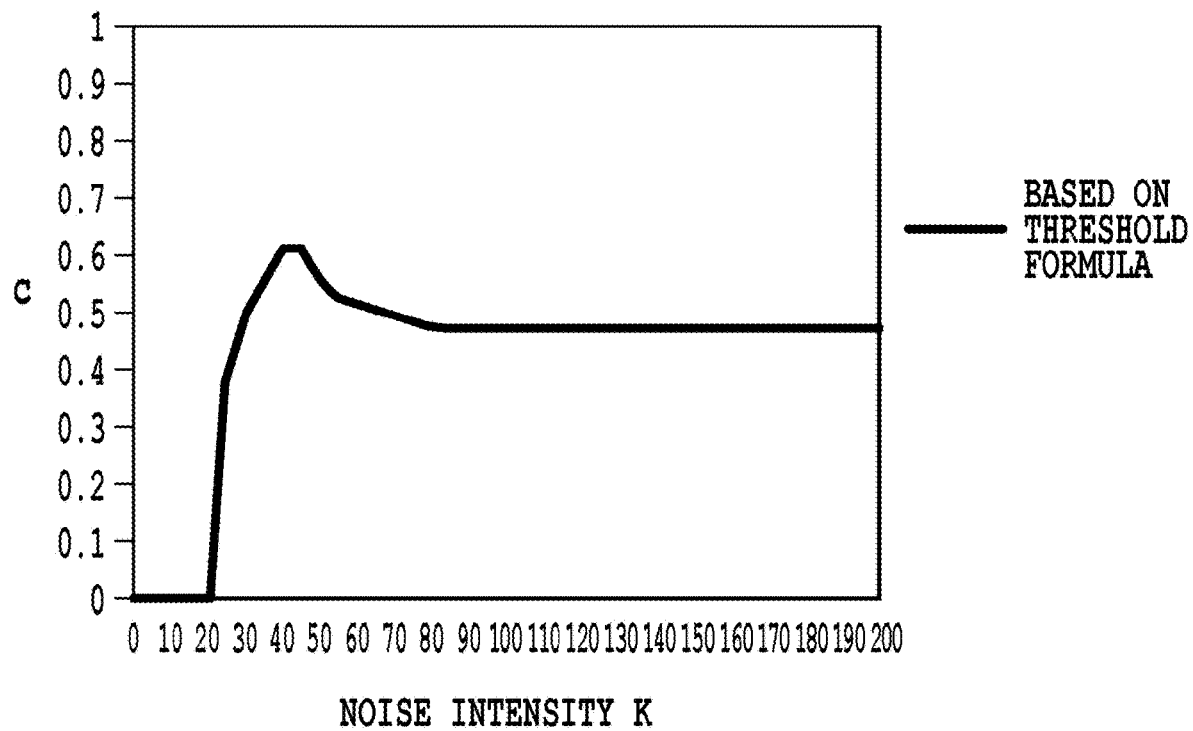
FIGS. 11A and 11B illustrate the relation between the correlation coefficient C and the noise strength.
Figure 11B:
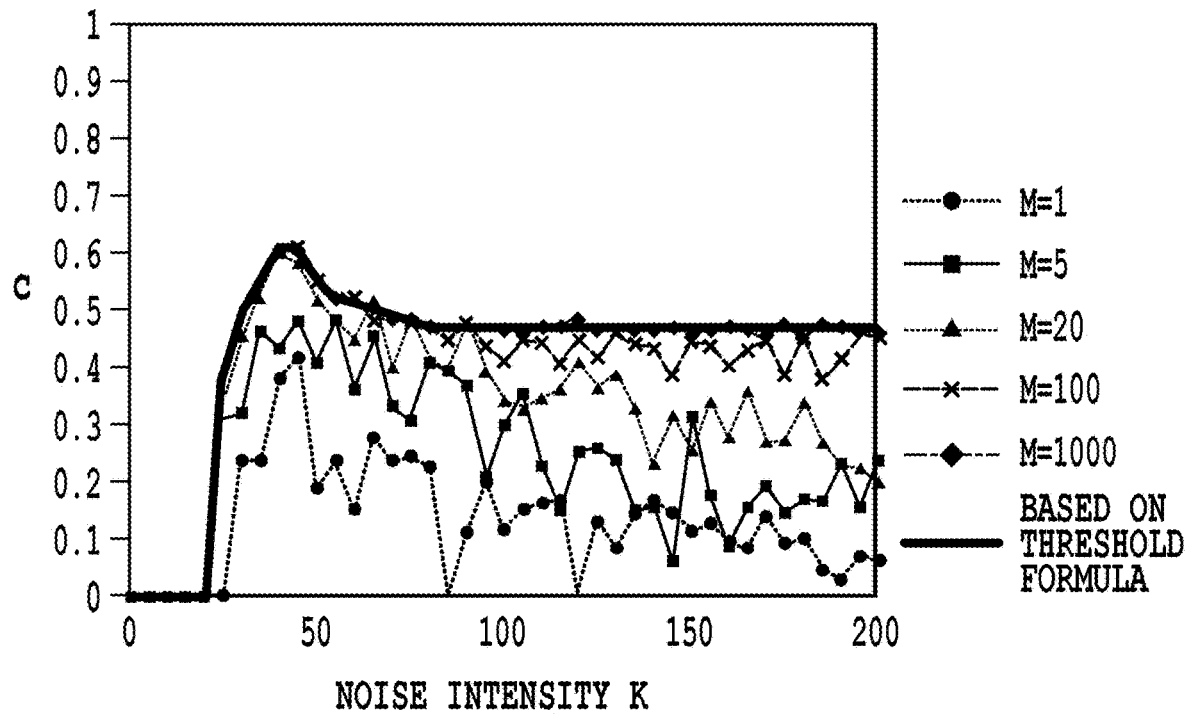

FIGS. 11A and 11B illustrate the correlation coefficient C in the case where the noise strength K is changed within the range from 0 to 200 while fixing the binary threshold value to T=80. FIG. 11A shows a theoretical value based on the Formula 9. FIG. 11B illustrates the case in which the number of samples M of the stochastic resonance processing shown in the Formula 3 is variously changed with regard to the result of FIG. 9B.

In FIG. 11A, in a case where the noise strength K exceeds about 20, the correlation coefficient C is higher than 0 and is maximum at K=40 and the correlation coefficient C declines again in a case where the noise strength K exceeds about 40 and is subsequently stabilized. It can be seen from FIG. 11B that the increase of the number samples of M (i.e., the number of samples M closer to an infinite number) allows the correlation coefficient C to approach the theoretical value. That is, the correlation coefficient C can be considered as a function of the noise strength K and it is clear that the correlation coefficient C has a local maximum value as a maximum value. In a case where the stochastic resonance processing is performed using the noise strength K at this local maximum value, the image inspection can be carried out while setting the correlation coefficient C to a high level.

Figure 12:
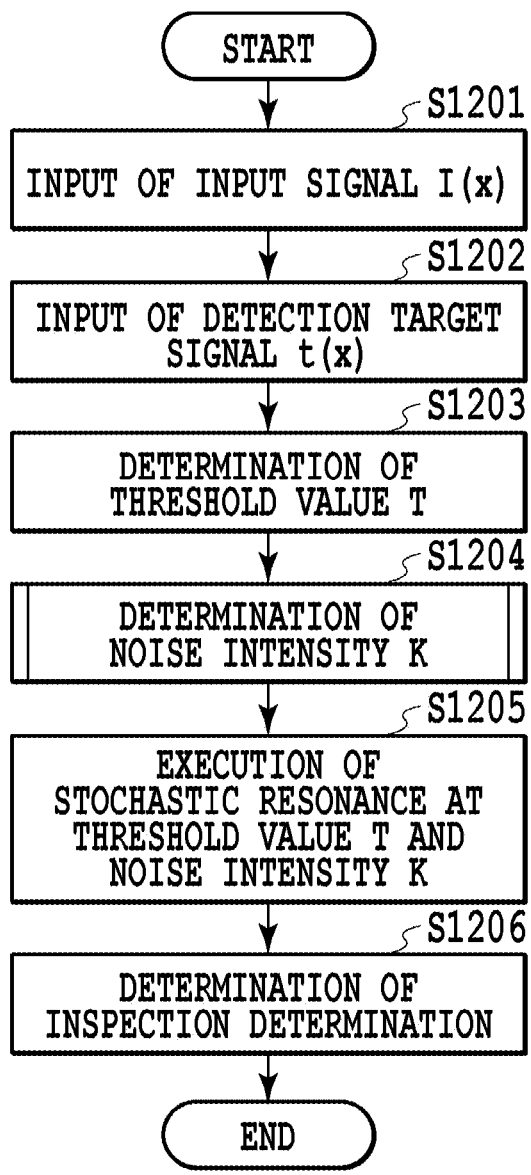
FIG. 12 is a flowchart illustrating a singular portion detection algorithm in the first embodiment.

FIG. 12 is a flowchart illustrating the processing executed by the CPU 301 of the image processing apparatus 1 in the singular portion detection algorithm of this embodiment. In a case where this processing is started, in Step S1201, the CPU 301 firstly acquires the reading data $I(x)$ as shown in FIG. 9B. Specifically, an image printed by the printing head 100 is allowed via the scanner controller 307 to be read by the reading head 107 and the data $I(x)$ is acquired as a brightness value corresponding to an individual pixel. x denotes a pixel position.

Next, in Step S1202, the CPU 301 acquires the detection target data $t(x)$ shown in FIG. 9A. The detection target data is prepared for each type of a target to be extracted (e.g., white stripe, density unevenness) and may be stored in the HDD 303 in advance or may be externally acquired as required.

In Step S1203, the CPU 301 determines the threshold value T. The threshold value T is such a value that is set to a value higher than the maximum signal value SigMax at which the reading data shown in FIG. 9B is maximum, from among the pixel positions x having a signal value of "1" in the detection target data shown in FIG. 9A. In the case of FIG. 9B, the brightness value "60" for a position in the 5th column from the left side and in the 3rd row from the lower side and a position in the 17th column from the left side and in the 2nd row from the lower side is set as the maximum signal value SigMax. A value higher than the maximum signal value SigMax=60 is illustratively set as a threshold value T=80.

In Step S1204, the CPU 301 sets an optimal noise strength K. Specifically, the correlation coefficient C shown in the formula 9 is differentiated by the noise strength K. The noise strength K at which the derivative value is 0 is set as an optimal noise strength. The reason is that FIGS. 11A and 11B show that the correlation coefficient C is local-maximum and maximum in a case where the derivative value is 0. This will be described in detail below.

Figure 13:
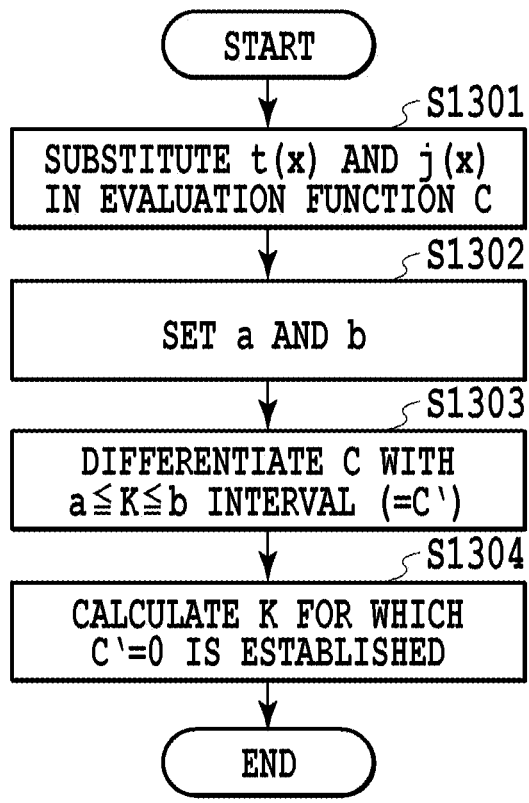
FIG. 13 is a flowchart for explaining the processing in a strength setting step.

FIG. 13 is a flowchart for explaining the processing executed by the CPU 301 in the noise strength setting step of Step S1204. in a case where this processing is started, the CPU 301 in Step S1301 firstly inputs the detection target signal $t(x)$ shown in FIG. 9A to the Formula showing the correlation coefficient C and further substitutes the Formula 7 or Formula 8 for $J(x)$. As a result, the correlation coefficient C is set to a function for the noise strength K only. In Step S1302, a range $a \leq K \leq b$ is set within which the function $C(K)$ obtained in Step S1301 is differentiated.

Figure 14A:
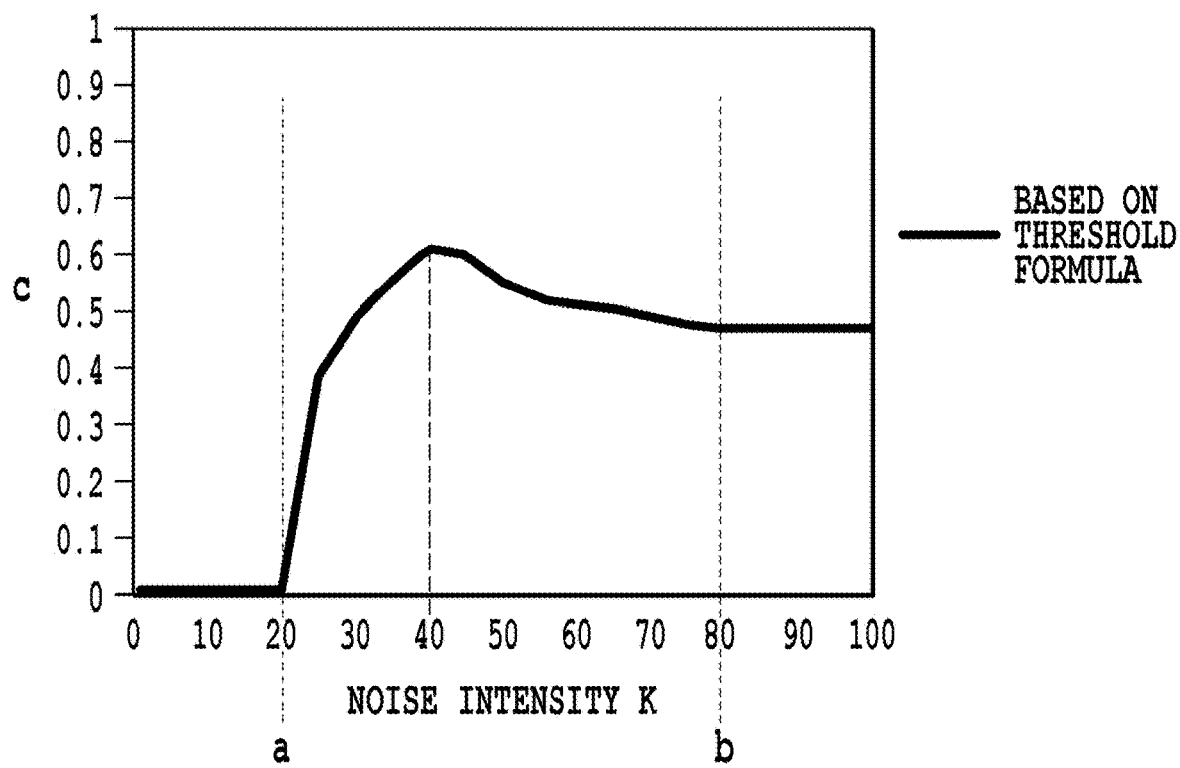
FIGS. 14A and 14B illustrate the range within which the noise strength K can be set.

FIG. 14A is a diagram for explaining the differentiation range a≤K≤b. Regarding the correlation coefficient C(K), C(K)=0 is established in a case where K is equal to or lower than a certain value while C(K)>0 is established in a case where this value is exceeded. The value K functioning as a boundary as described above is, in a case where referring to the Formula 7 or Formula 8, a boundary value for K for which T>I(x)+K is satisfied for all pixels and T≤I(x)+K is satisfied for any one pixel. In other words, this is a boundary at which all pixels apply to the second condition in the Formula 7 or Formula 8 and any one pixel applies to the third condition in the Formula 7 or Formula 8. Such a value K can be expressed as T−SigMax using the maximum signal value SigMax of I(x) for all pixels. In this embodiment, the value K as described above is set to a lower-limit value a=T−SigMax for the derivating.

On the other hand, the correlation coefficient C(K) is convergent to have a fixed value in a case where the value K is equal to or higher than a certain value. The value K in a case where the correlation coefficient C(K) is convergent shows a case, referring to the Formula 7 or Formula 8, in which T<I(x)+K is satisfied for all pixels x, i.e., a case in which all pixels apply to the first or third condition in the Formula 7 or Formula 8 and even the minimum value of the input signal I(x) exceeds the threshold value T. The value K as described above can be expressed as T−SigMin using the minimum signal value SigMin of I(x) among all pixels. In this embodiment, the value K as described above is set to a lower-limit derivative value b=T−SigMin. In the case of this example, T=80, SigMax=60, and SigMin=0 are established. Thus, a=20 and b=80 are established. It is known that the function C(K) has only one local maximum value within the range of a≤K≤b.

Figure 15:
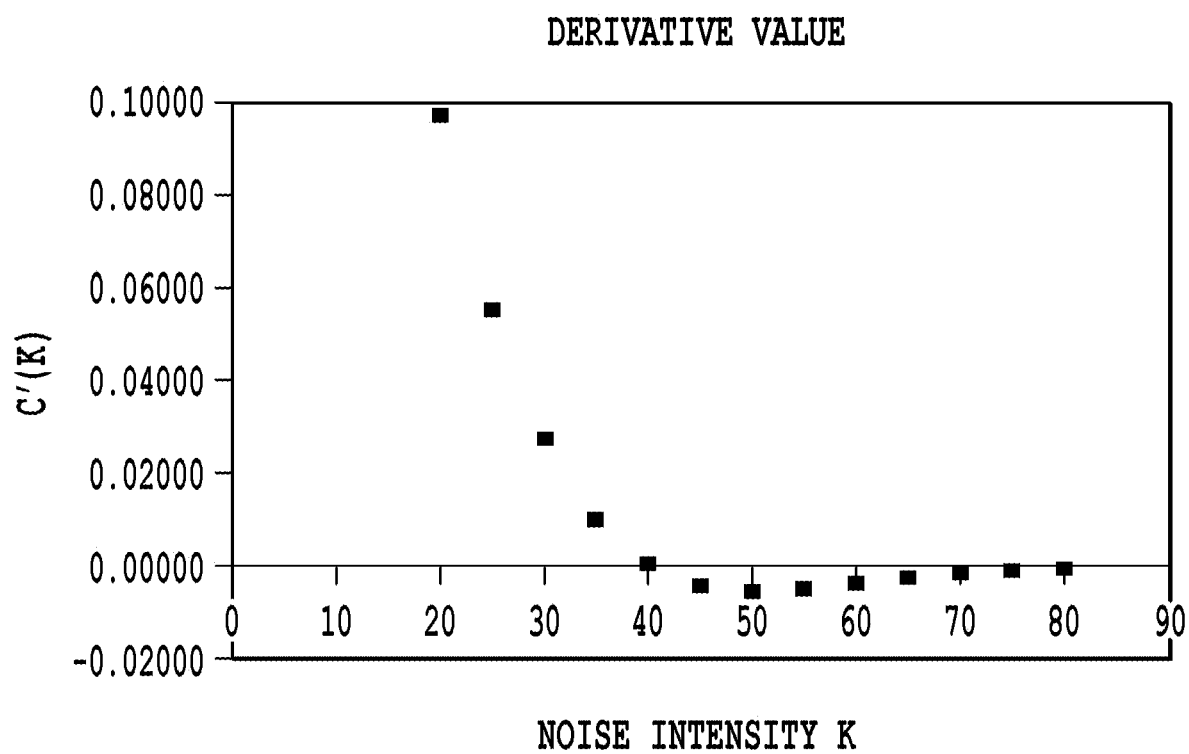
FIG. 15 illustrates a derivative value of the correlation coefficient C.

Next, in Step S1303, the CPU 301 differentiates the correlation coefficient C(K) calculated in Step S1301 by the noise strength K within the range of a≤K≤b. FIG. 15 illustrates the derivative value C'(K) of the correlation coefficient C(K) within the range of a≤K≤b. It can be seen that the derivative value changes from positive to negative in the neighborhood of K=40 and C(K) has a local maximum value at this position. The CPU 301 calculates K at which C'(K)=0 is established and sets this as an optimal noise strength K=40. Then, this processing is completed.

Returning to the flowchart of FIG. 12, in a case where the optimal noise strength is set in Step S1204, the CPU 301 proceeds to Step S1205 to execute a predetermined stochastic resonance processing. Specifically, the CPU 301 substitutes the threshold value T set in Step S1203, the noise strength K set in Step S1204, and the reading data I(x) acquired in Step S1201 into the Formula 7 or Formula 8 to calculate J(x) for an individual pixel.

FIG. 10B illustrates J(x) calculated with regard to the reading data I(x) shown in FIG. 9B based on the Formula 8 assuming that the threshold value T=80 and the noise strength K=40 are set. As compared with FIG. 10A in the case where the threshold value T=80 and the noise strength K=30 are set, such a result is obtained that is closer to the detection target data t(x) shown in FIG. 9A.

In Step S1206, the CPU 301 performs determination processing based on the result of performing the stochastic resonance processing under preferred conditions in Step S1205. Specifically, in a case where the number of pixels whose value is equal to or higher than a predetermined value is equal to or higher than a predetermined value in the image, the CPU 301 may determine the inspected image is defective. Alternatively, a pixel whose value is equal to or higher than a predetermined pixel value also may be displayed on the display apparatus connected via the display I/F 306 as shown in FIG. 10B in a popped-up manner so that an inspector can observe the pixel. Then, this processing is completed.

The detection result thus obtained may be stored as information unique to the printing apparatus so that the result can be used for the subsequent printing control. For example, a position at which a white stripe is generated can be stored in the ROM 313 of the complex machine 6 and the number of times of ejection by a printing element positioned near the white stripe can be increased during the actual printing operation, thereby allowing the white stripe within the image to be less conspicuous.

According to this embodiment described above, the existence or nonexistence of the singular portion such as a white stripe appearing at the specific position can be accurately determined. For example, even when an image not including a white stripe is subjected to processing in a series of steps in the flowchart shown in FIG. 12, the optimal threshold value T and the optimal noise strength K are set in Step S1203 and Step S1204. In the case as described above, however, the correlation to the inspection target data t(x) is low, thus failing to provide a result in which values equal to or higher than the predetermined pixel values are distributed at specific positions as shown in FIGS. 10A and 10B. Thus, in the determination processing of Step S1206, the inspector can determine that no white stripe is generated based on the status of the pop-upped image. Furthermore, since the number of pixels having values equal to or higher than the predetermined pixel values is less than the predetermined number, the CPU 301 can determine that no white stripe is generated.

By the way, in the above description, the noise strength K at which C(K) has a local maximum value is set as the noise strength K for the stochastic resonance processing executed in Step S1205. However, the noise strength K at which C(K) has a local maximum value is not always required to improve the detection accuracy. Specifically, by obtaining the correlation coefficient C having a value higher than that of the correlation coefficient C of the reading data I(x) itself to the detection target data t(x), the detection accuracy can be improved as compared with a case where no stochastic resonance processing is performed. Specifically, in the case of the reading data shown in FIG. 9B, the correlation coefficient C to the detection target data of FIG. 9A is 0.47. Thus, such stochastic resonance processing may be carried out that provides the correlation coefficient C higher than 0.47.

Comparing FIGS. 10A and 10B for example, FIG. 10B has a higher correlation to the detection target data shown in FIG. 9A and thus an accurate detection can be performed, as already described above. However, even in the case of FIG. 10A based on the noise strength K=30, the correlation coefficient C is 0.49, which is a value higher than the correlation coefficient (C=0.47) in a case where no stochastic resonance processing is performed, thus providing the effect of the stochastic resonance processing.

Figure 14B:
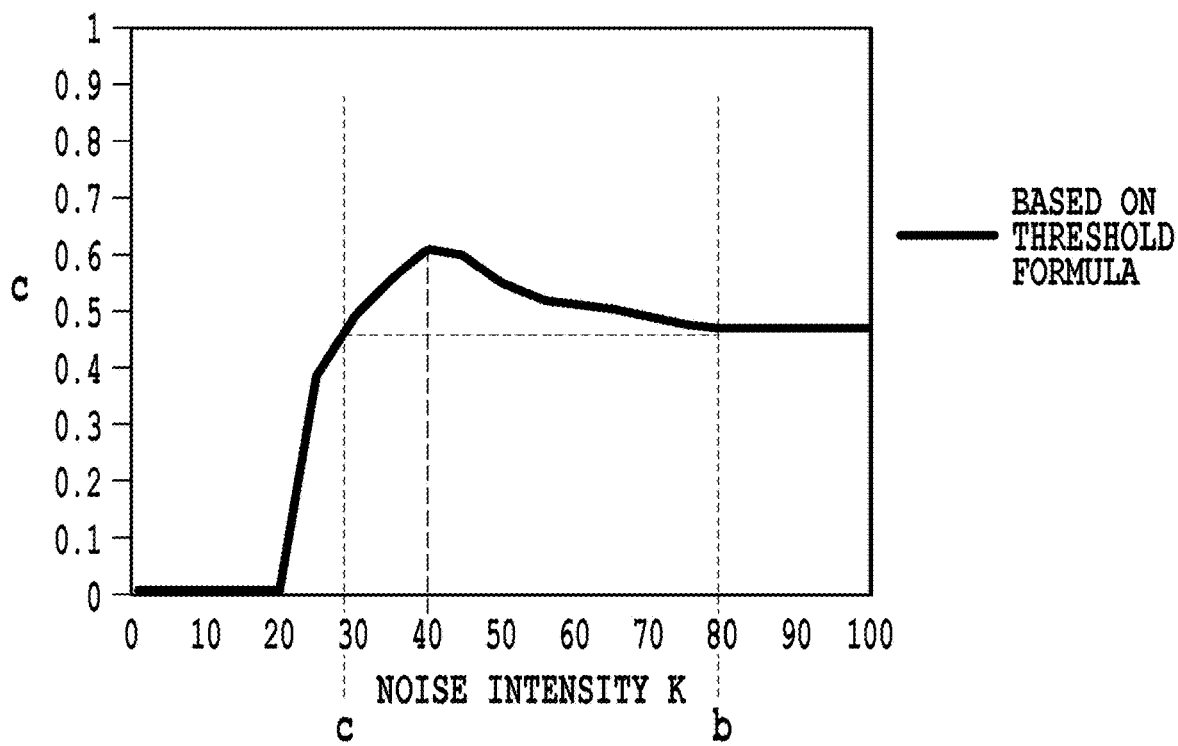

FIG. 14B is a diagram for explaining the range of the noise strength K within which the correlation coefficient C as described above can be obtained. In a case where the noise strength K is higher than b, the effect of the stochastic resonance processing is no more obtained and the correlation coefficient C is the correlation coefficient C=0.47 of the reading data I(x) itself to the detection target data t(x). That is, the noise strength K must satisfy K<b in order to obtain the effect of the stochastic resonance processing. On the other hand, it is known that the correlation coefficient C has one local maximum value within the range of 0<K<b. Thus, another K satisfying C(K)=0.47 exists within the range of K b. This is assumed as c (C(b)=C(c)=0.47). That is, by setting K satisfying c<K<b as the noise strength K and by performing the above-described stochastic resonance processing, the correlation coefficient and detection accuracy can be improved as compared with a case where no stochastic resonance processing is performed.

In the inspection system however, even in a case where the above range is used, the noise strength K is preferably set to a value that is higher than a value satisfying C'(K)=0 (a value satisfying K=40 in the case of this example). The reason is that, in the case of an inspection system, "no detection" showing the failure to extract a pixel having a possibility of a singular portion is a serious disadvantage and thus it is important that the status of "excessive detection" to extract an excessive amount of normal pixels as a singular portion is maintained. Thus, "no detection" can be actively avoided by setting the noise strength K within the 40≤K≤b rather than within the range of c≤K≤40 so as to increase the probability at which each pixel has a binarization result of 1.

Although the above section has described a white stripe as an example, as has been described earlier, this embodiment also can detect a singular portion having another feature. In such a case, detection target data t(x) may be prepared in advance for each type of a singular portion to be extracted (e.g., white stripe, density unevenness). Additionally, the flowchart shown in FIG. 12 may be carried out repeatedly while exchanging the detection target data t(x) in order to detect a singular portion having a different feature such as a white stripe or density unevenness. In a case where a plurality of test patterns printed using different printing heads on the same type of printing medium based on the same printing data are inspected continuously, the optimal threshold value T and the noise strength K also can be shared among a plurality of test patterns. In such a case, the threshold value T and the noise strength K obtained in Steps S1203 and S1204 to the first test pattern for example may be temporarily stored and Steps S1203 and S1204 may be omitted for the subsequent test patterns. This can consequently shorten the inspection step to the same type of singular portions.

According to this embodiment as described above, the stochastic resonance processing can be performed, without requiring many nonlinear circuits, with an effective noise strength set for the detection target data. Thus, a target singular portion can be detected accurately and effectively.

Second Embodiment

In the first embodiment, a case was described in which, in a case where a position at which a singular portion such as a white stripe appears is clear, whether or not a singular portion occurs at such a position is accurately detected. However, in an actual inspection step, another case is assumed where a position at which a singular portion occurs cannot be securely known. For example, with reference to FIG. 5, in a case where a pattern printed by the printing head 100 is read by the reading head 107, there is a certain distance therebetween. Thus, in a case where a slight dislocation occurs in the conveying direction, it is expected that the position of a white stripe in the X direction when the printing head 100 prints is different from the position of the white stripe in the X direction in a case where the reading head 107 detects it. With reference to FIGS. 6A and 6B, the overlap region D has a width corresponding to a plurality of pixels, which may cause a case where the position of a white stripe caused by an error during the manufacture of the printing head cannot be accurately determined. In view of the situation as described above, a plurality of detection target signals t(x) are prepared in advance in this embodiment. This embodiment will be described, as in the first embodiment, via an example of a configuration consisting of the image processing apparatus 1 and the complex machine 6 described for FIG. 3D to FIG. 6B.

Figures 16A, 16B, 16C, 16D, 16E:
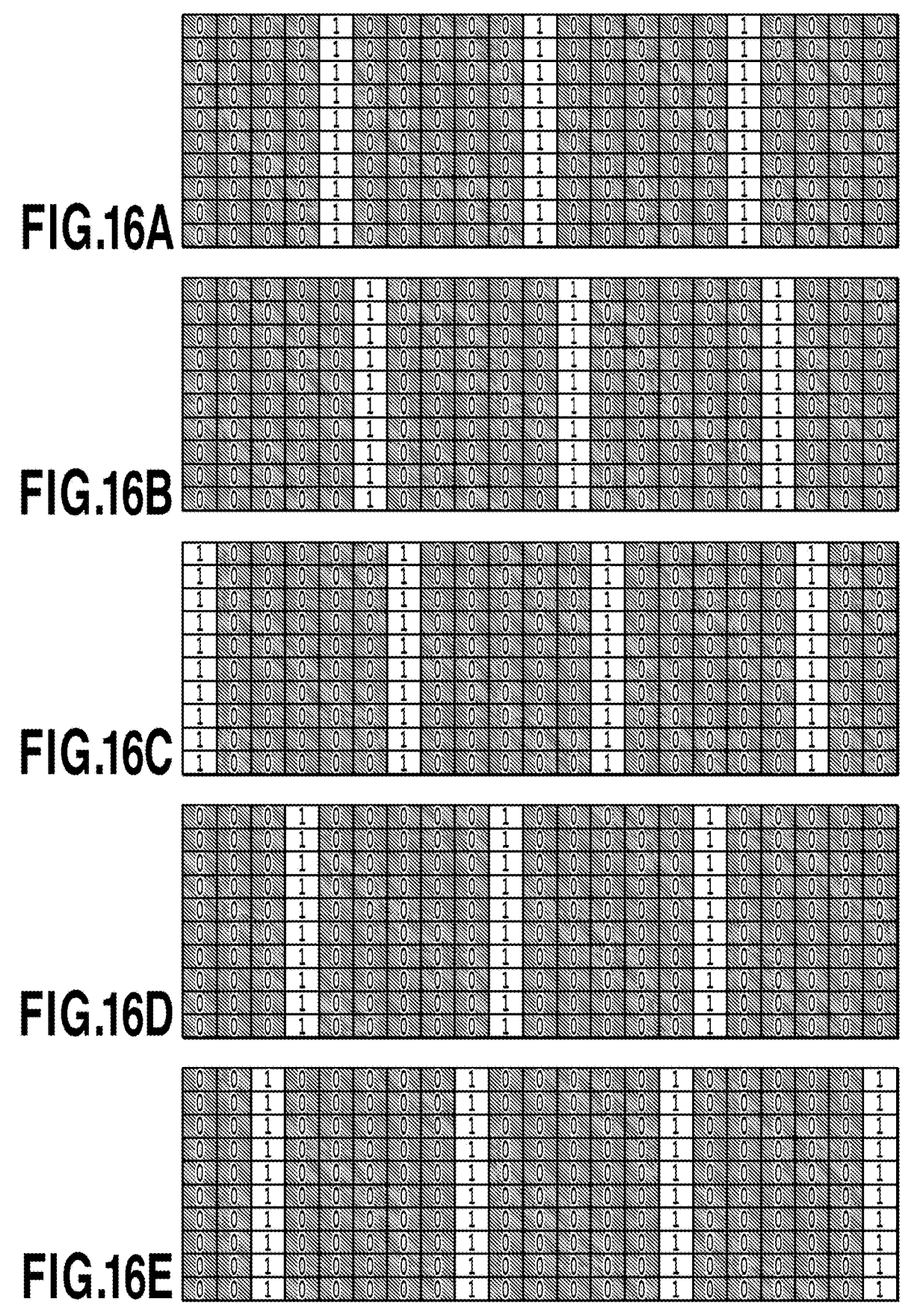

FIGS. 16A to 16E illustrate five types of pieces of detection target data t(x) prepared in this embodiment. FIG. 16A corresponds to FIG. 9A. FIGS. 16B to 16E illustrate a pattern obtained by shifting the data shown in FIG. 16A by 1 pixel and 2 pixels in the ±X direction. By preparing the detection target data t(x) as described above, even in a case where the position of the white stripe is dislocated in the ±X direction from the position of FIG. 16A by about 1 pixel to 2 pixels, the position can be detected with an accuracy similar to that of the first embodiment.

Figure 17:
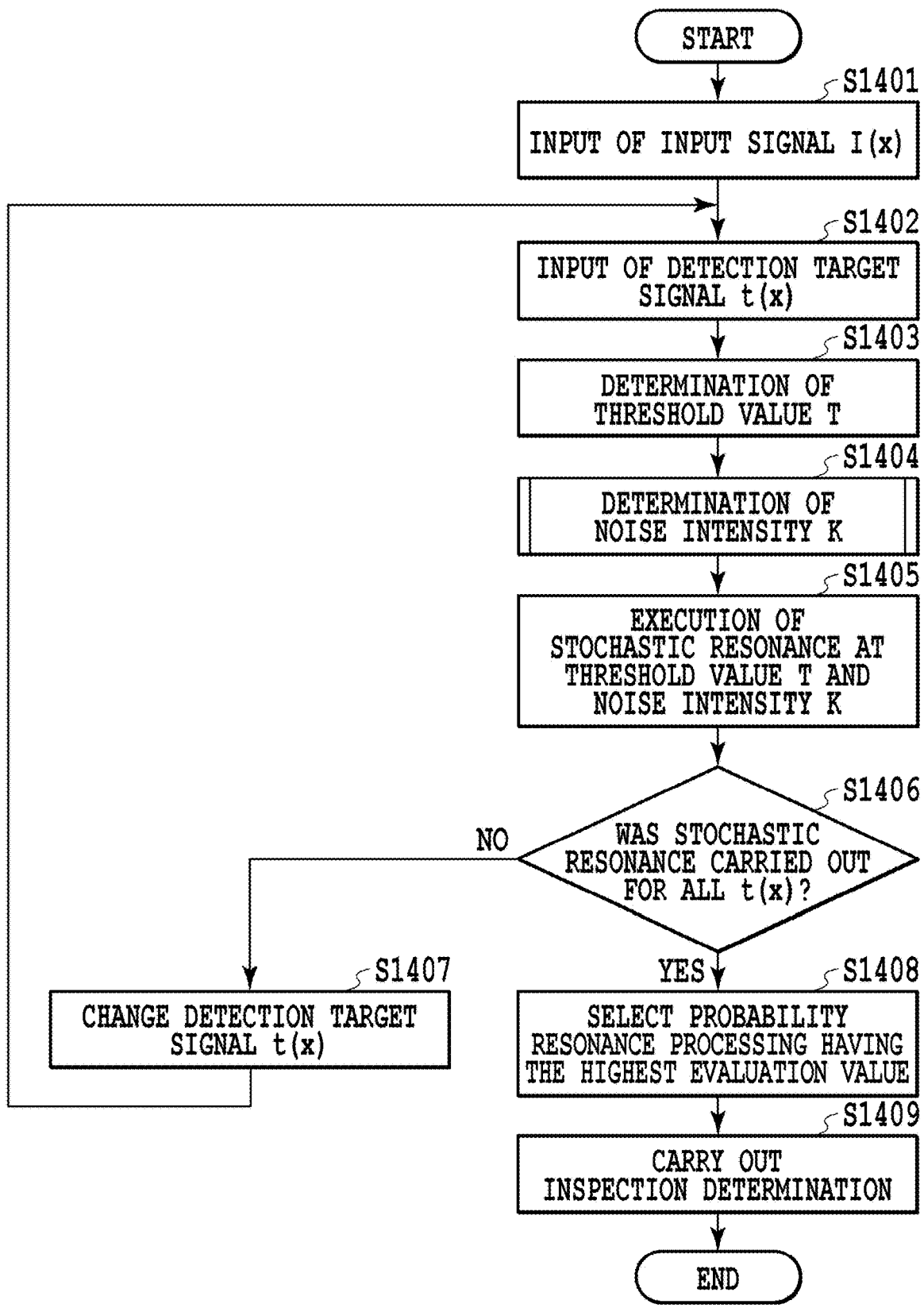
FIG. 17 is a flowchart illustrating the singular portion detection algorithm in the second embodiment.

FIG. 17 is a flowchart for explaining the stochastic resonance processing executed by the CPU 301 of the image processing apparatus 1 in this embodiment. In a case where this processing is started, the CPU 301 firstly acquires, as in the first embodiment, the reading data I(x) as shown in FIG. 9B in Step S1401.

Next, in Step S1402, the CPU 301 acquires one of the pieces of detection target data t(x) shown in FIGS. 16A to 16E. The detection target data of FIGS. 16A to 16E may be stored in the HDD 303 in advance or may be externally acquired as required.

The processing operations of Steps S1403 to Step S1405 are similar to those of Steps S1203 to Step S1205 in FIG. 12 and thus will not be described further. However, J(x) acquired in Step S1405 is temporarily stored in the RAM 302 while being associated with the detection target data of FIGS. 16A to 16E.

In Step S1406, the CPU 301 determines whether or not the stochastic resonance processing is executed for all of the detection target data shown in FIGS. 16A to 16E. If it is determined that there is remaining detection target data to be acquired, then Step S1407 acquires one of the pieces of detection target data t(x) shown in FIGS. 16A to 16E that is not yet used for the stochastic resonance processing and then the processing returns to Step S1402. In a case where Step S1406 determines that all of the detection target data is subjected to the stochastic resonance processing, then the processing proceeds to Step S1408.

In Step S1408, the CPU 301 compares the results J(x) after the stochastic resonance processing obtained through the respective processing in Step S1405 and selects the one having the highest evaluation value C. Then, the processing proceeds to Step S1409 and the CPU 301 performs a determination processing based on the result after the stochastic resonance processing selected in Step S1408. Specifically, as in the first embodiment, a pixel having a value equal to or higher than a predetermined pixel value is obtained may be popped up so that the pixel can be observed by an inspector or, in a case where the number of pixels having values equal to or higher than the predetermined pixel values is equal to or higher than a predetermined number, the CPU 301 may determine that the inspection target image is defective. Then, this processing is completed.

According to this embodiment described above, even in a case where a slight dislocation is caused between a position at which an actual singular portion is generated and the reading position, the specific singular portion can be accurately and effectively detected as in the first embodiment. In FIGS. 16A to 16E, a plurality of detection target patterns having the same cycle and different phases were prepared. However, this embodiment is not limited to such an example. Thus, when a cycle at which a singular portion appears or the size thereof or the number thereof is variously expected, then a plurality of detection target patterns having mutually-different ones may be prepared in advance.

In the above embodiment, an example was described regarding an image processing apparatus for performing stochastic resonance processing on brightness data for the respective pixels read by the reading head 107. However, the signal extraction processing apparatus of the present invention is not limited to such an embodiment. For example, even in the case of an input signal for which the current value I(x) changes depending on time such as the vibration of an object or a change of sound, a to-be-extracted detection target signal is buried in noise. Even in such a case, if the detection target data t(x) to the time axis x can be prepared in advance, the detection target signal can be extracted from the input data I(x) accurately and effectively as in the above embodiment.

Furthermore, although the above description has been made via an example of a system obtained by connecting the complex machine 6 to the image processing apparatus 1 as shown in FIG. 4, the present invention is not limited to such an embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-070798, filed Mar. 31, 2016, which is hereby incorporated by reference wherein in its entirety.

What is claimed is:

1. A signal processing apparatus, comprising:
a processor serving as:
(i) an acquisition unit configured to acquire input data having input signals I(x) corresponding to a plurality of pixel positions x respectively, and detection target data having detection target signals t(x) corresponding to the plurality of pixel positions x as a target to be detected respectively, the input data being acquired by reading an image printed by a printing apparatus and the detection target data being image data indicating a singular portion that appears and is caused by an error of the printing apparatus;
(ii) a noise strength setting unit configured to set, based on the input data and the detection target data, a noise strength K that is used to be added to the input signals I(x) to subject the input signals I(x) to a predetermined stochastic resonance processing; and
(iii) a stochastic resonance processing unit configured to use the noise strength K set by the noise strength setting unit and a threshold value T to quantize the input signals I(x) to subject the input signals I(x) to the predetermined stochastic resonance processing to output data having processed signals J'(x),
wherein:
J'(x) is a convergence value of J(x) in a case where M increases, J(x) being obtained according to the following Formulas 1 to 3:

$$i(x,m)=I(x)+N(x,m)\times K \qquad \text{(Formula 1)}$$

$$\text{if } i(x,m)\geq T, j(x,m)=1$$

$$\text{if } i(x,m)<T, j(x,m)=0 \qquad \text{(Formula 2)}$$

$$J(x) = \frac{1}{M}\sum_{m=1}^{M} j(x,m) \qquad \text{(Formula 3)}$$

where:
i(x,m) is a signal value after adding the noise strength K, j(x,m) is a binary signal obtained by comparing the signal value i(x,m) with a predetermined threshold value T, M is a number of branch paths for the input signals I(x), m is a parameter showing one of M branch paths and is an integer in the range from 1 to M, and N(x,m) is a random number noise corresponding to the branch path m of the pixel position x and has the range from 1 to 0;
a correlation coefficient showing a correlation between J'(x) and the detection target signal t(x) for the plurality of pixel positions x is a function C(K) of the noise strength K, and
the noise strength setting unit sets the noise strength K based on the function C(K).

2. The signal processing apparatus according to claim 1, wherein the noise strength setting unit sets the noise strength K satisfying a condition that the function C(K) is a local maximum value.

3. The signal processing apparatus according to claim 1, wherein the noise strength setting unit sets the noise strength K so that the correlation coefficient C(K) of a case where the predetermined stochastic resonance processing is performed is larger than the correlation coefficient C(K) of a case where the predetermined stochastic resonance processing is not performed.

4. The signal processing apparatus according to claim 1, wherein the noise strength setting unit sets the noise strength K within a range higher than the noise strength K satisfying a condition that the correlation coefficient C(K) is a local maximum value and lower than the noise strength K in a case where the correlation coefficient C(K) becomes convergent at a fixed value.

5. The signal processing apparatus according to claim 1, wherein the noise is white noise having an upper limit at the noise strength K set by the noise strength setting unit.

6. The signal processing apparatus according to claim 1, wherein the noise is normal distribution noise having an upper limit at the noise strength K set by the noise strength setting unit.

7. The signal processing apparatus according to claim 1, the processor further serving as a threshold value setting unit configured to set the threshold value T for quantizing used in the predetermined stochastic resonance processing for the input signals I(x), based on the input data and the detection target data.

8. The signal processing apparatus according to claim 1, wherein:
the detection target data is prepared as a plurality of pieces of detection target data having different phases with respect to the pixel position;
the acquisition unit acquires the plurality of pieces of the detection target data;
the noise strength setting unit sets the noise strength K for each of the plurality of pieces of the detection target data; and
the stochastic resonance processing unit uses the respective noise strengths set by the noise strength setting unit to subject the input signals I(x) to the predetermined stochastic resonance processing; and
the processor further serving as a selection unit configured to compare a plurality of results of the predetermined stochastic resonance processing executed by the stochastic resonance processing unit to select one result.

9. The signal processing apparatus according to claim 1, wherein the predetermined stochastic resonance processing is performed by using the following formula to calculate the processed data J'(x) obtained from the input data I(x), if $I(x) > T, J'(x) = 1$ if $I(x) < T-K, J'(x) = 0$ if $T-K < I(x) < T, J'(x) = 1-(T-I(x))/K$.

10. The signal processing apparatus according to claim 1, the processor further serving as a display control unit configured to display the result of the stochastic resonance processing executed by the stochastic resonance processing unit on a display apparatus.

11. The signal processing apparatus according to claim 1, the processor further serving as a reading unit configured to read an image,
wherein the input data is image data of the reading result of the reading unit.

12. The signal processing apparatus according to claim 11, the processor further serving as a printing unit configured to print an image,
wherein the reading unit reads the image printed by the printing unit.

13. A signal processing method, comprising:
an acquisition step of acquiring input data having input signals I(x) corresponding to a plurality of pixel position x respectively, and detection target data having detection target signals t(x) corresponding to the plurality of pixel positions x as a target to be detected respectively, the input data being acquired by reading an image printed by a printing apparatus and the detection target data being image data indicating a singular portion that appears and is caused by an error of the printing apparatus;
a noise strength setting step of setting, based on the input data and the detection target data, a noise strength K that is used to be added to the input signals I(x) to subject the input signals I(x) to a predetermined stochastic resonance processing; and
a stochastic resonance processing step of using the noise strength K set by the noise strength setting step and a threshold value T to quantize the input signals I(x) to subject the input signals I(x) to the predetermined stochastic resonance processing to output data having processed signals J'(x),
wherein:
J'(x) is a convergence value of J(x) in a case where M increases, J(x) being obtained according to following Formulas 1 to 3:

$$i(x,m) = I(x) + N(x,m) \times K \quad \text{(Formula 1)}$$

if $i(x,m) T, j(x,m) = 1$ if $i(x,m) < T, j(x,m) = 0 \quad \text{(Formula 2)}$ $$J(x) = \frac{1}{M} \sum_{m=1}^{M} j(x, m) \quad \text{(Formula 3)}$$

where:
i(x,m) is a signal value after adding the noise strength K, j(x,m) is a binary signal obtained by comparing the signal value i(x,m) with a predetermined threshold value T, M is a number of branch paths for the input signals I(x), m is a parameter showing one of M branch paths and is an integer in the range from 1 to M, and N(x,m) is a random number noise corresponding to the branch path m of the pixel position x and has the range from 1 to 0;
a correlation coefficient showing a correlation between J'(x) and the detection target signal t(x) for the plurality of pixel positions x is a function C(K) of the noise strength K, and
the noise strength setting unit sets the noise strength K based on the function C(K).

14. The signal processing method according to claim 13, wherein the noise strength setting step sets the noise strength K satisfying a condition that the function C(K) is a local maximum value.

15. The signal processing method according to claim 13, wherein the noise strength setting step sets the noise strength K so that the correlation coefficient C(K) of a case where the predetermined stochastic resonance processing is performed is larger than the correlation coefficient C(K) of a case where the predetermined stochastic resonance processing is not performed.

16. The signal processing method according to claim 13, wherein the noise strength setting step sets the noise strength K within a range higher than the noise strength K satisfying a condition that the correlation coefficient C(K) is a local maximum value and lower than the noise strength K in a case where the correlation coefficient C(K) becomes convergent at fixed value.

17. The signal processing method according to claim 13, wherein the noise is white noise having an upper limit at the noise strength K set by the noise strength setting step.

18. The signal processing method according to claim 13, wherein the noise is normal distribution noise having an upper limit at the noise strength K set by the noise strength setting step.

19. The signal processing method according to claim 13, further comprising:
a threshold value setting step of setting the threshold value T for quantizing used in the predetermined stochastic resonance processing for the input signals I(x), based on the input data and the detection target data.

20. The signal processing method according to claim 13, wherein:
the detection target data is prepared as a plurality of pieces of detection target data having different phases with respect to the pixel position;
the acquisition step acquires the plurality of pieces of the detection target data;
the noise strength setting step sets the noise strength K for each of the plurality of pieces of the detection target data; and
the stochastic resonance processing step uses the respective noise strengths set by the noise strength setting step to subject the input signals I(x) to the predetermined stochastic resonance processing; and
the signal processing method further comprises a selection step of comparing a plurality of results of the predetermined stochastic resonance processing executed by the stochastic resonance processing step to select one result.

21. The signal processing method according to claim 13, wherein the predetermined stochastic resonance processing is performed by using the following formula to calculate the processed data J'(x) obtained from the input data I(x), if $I(x) > T, J'(x) = 1$ if $I(x) < T-K, J'(x) = 0$ if $T-K < I(x) < T, J'(x) = 1 - (T-I(x))/K$.

22. The signal processing method according to claim 13, further comprising a display control step of displaying the result of the stochastic resonance processing executed by the stochastic resonance processing step on a display apparatus.

23. The signal processing method according to claim 13, further comprising a reading step of reading an image,
wherein the input data is image data of the reading result of the reading step.

24. The signal processing method according to claim 23, further comprising a printing step of printing an image,
wherein the reading step reads the image printed by the printing step.

25. A non-transitory computer-readable storage medium which stores a program for allowing a signal method to be executed by a computer, the signal processing method comprising:
an acquisition step of acquiring input data having input signals I(x) corresponding to a plurality of pixel position x respectively, and detection target data having detection target signals t(x) corresponding to the plurality of pixel positions x as a target to be detected respectively, the input data being acquired by reading an image printed by a printing apparatus and the detection target data being image data indicating a singular portion that appears and is caused by an error of the printing apparatus;
a noise strength setting step of setting, based on the input data and the detection target data, a noise strength K that is used to be added to the input signals I(x) to subject the input signals I(x) to a predetermined stochastic resonance processing; and
a stochastic resonance processing step of using the noise strength K set by the noise strength setting step and a threshold value T to quantize the input signals to subject the input signals I(x) to the predetermined stochastic resonance processing to output data having processed signals J'(x),
wherein:
J'(x) is a convergence value of J(x) in a case where M increases, J(x) being obtained according to following Formulas 1 to 3:

$i(x,m) = I(x) + N(x,m) \times K$ (Formula 1)

if $i(x,m) \geq T, j(x,m) = 1$ if $i(x,m) < T, j(x,m) = 0$ (Formula 2)

$$J(x) = \frac{1}{M} \sum_{m=1}^{M} j(x, m)$$ (Formula 3)

where:
i(x,m) is a signal value after adding the noise strength K, j(x,m) is a binary signal obtained by comparing the signal value i(x,m) with a predetermined threshold value T, M is a number of branch paths for the input signals I(x), m is a parameter showing one of M branch paths and is an integer in the range from 1 to M, and N(x,m) is a random number noise corresponding to the branch path m of the pixel position x and has the range from 1 to 0;
a correlation coefficient showing a correlation between J'(x) and the detection target signal t(x) for the plurality of pixel positions x is a function C(K) of the noise strength K, and
the noise strength setting unit sets the noise strength K based on the function C(K).

26. A signal processing apparatus, comprising:
a processor serving as:
(i) an acquisition unit configured to acquire input data having input signals I(x) corresponding to a plurality of pixel position x respectively, and detection target data having detection target signals t(x) corresponding to the plurality of pixel positions x as a target to be detected respectively, the input data being acquired by reading an image printed by a printing apparatus and the detection target data being image data indicating a singular portion that appears and is caused by an error of the printing apparatus;
(ii) a noise strength setting unit configured to set, based on the input data and the detection target data, a noise strength K that is used to be added to the input signals I(x) to subject the input signals I(x) to a predetermined stochastic resonance processing, the noise strength showing the strength of noise added to the input signals; and
(iii) a stochastic resonance processing unit configured to use the noise strength K set by the noise strength setting unit and a threshold value T to quantize the input signals I(x) to subject the input signals I(x) to the predetermined stochastic resonance processing to output processed data, wherein:
the predetermined stochastic resonance processing is a processing for outputting, in a method of adding noises to the same input signal I(x) and performing binarization processing in a plurality of branch paths to synthesize the results, a value J'(x) corresponding to a convergence value obtained in a case where the number of branch paths increases, and
the noise strength setting unit sets the noise strength K based on a function of a correlation coefficient C and the noise strength K: the correlation coefficient C showing a correlation between the result J'(x) of a case where each of the plurality of input signals I(x) are subjected to the predetermined stochastic resonance processing and the detection target signals t(x).

27. A signal processing apparatus, comprising:
a processor serving as:
(i) an acquisition unit configured to acquire input data having a plurality of input signals I(x) corresponding to a plurality of pixel positions x respectively, and detection target data having detection target signals as a target to be detected: the input data being acquired by reading an image printed by a printing apparatus and the detection target data being image data indicating a singular portion that appears and is caused by an error of the printing apparatus;
(ii) a noise strength setting unit configured to set, based on the input data and the detection target data, a noise strength K used to subject the input signals I(x) to a predetermined stochastic resonance processing, the noise strength K showing the strength of noise added to the input signals I(x); and
(iii) a stochastic resonance processing unit configured to use the noise strength K set by the noise strength setting unit and a threshold value T to quantize the input signals to subject the input signals I(x) to the predetermined stochastic resonance processing to output processed data, wherein:
the predetermined stochastic resonance processing is a processing based on a formula in which processed data J(x) is obtained based on I(x), the noise strength K and the threshold value T, and the processed data J(x) corresponds to a result in case the number of samples M closer to an infinite number in the following formula, $$J(x) = \frac{1}{M}\sum_{m=1}^{M} j(x, m)$$

where j(x,m) is a result of a processing in which a value obtained by multiplying a random number noise N(x, m) of 1 to 0 by the noise strength K is added to the input signal I(x,m) and further binarized, M indicates the number of the processing among which the random number noises are different and m indicates one of the plurality processing, and
the noise strength setting unit sets the noise strength K based on a function of a correlation coefficient and the noise strength K:
the correlation coefficient showing a correlation between the result of a case where each of the plurality of input signals I(x) is subjected to the predetermined stochastic resonance processing and the detection target data.

28. A signal processing method, comprising:
a processor serving as:
an acquisition step of acquiring input data having a plurality of input signals I(x) corresponding to a plurality of pixel positions x respectively, and detection target data having detection target signals as a target to be detected: the input data being acquired by reading an image printed by a printing apparatus and the detection target data being image data indicating a singular portion that appears and is caused by an error of the printing apparatus;
(ii) a noise strength setting step of setting, based on the input data and the detection target data, a noise strength K used to subject the input signals I(x) to a predetermined stochastic resonance processing, the noise strength K showing the strength of noise added to the input signals I(x); and
(iii) a stochastic resonance processing step of using the noise strength K set by the noise strength setting step and a threshold value T to quantize the input signals to subject the input signals I(x) to the predetermined stochastic resonance processing to output processed data, wherein:
the predetermined stochastic resonance processing is a processing based on a formula in which processed data J(x) is obtained based on I(x), the noise strength K and the threshold value T, and the processed data J(x) corresponds to a result in case the number of samples M closer to an infinite number in the following formula, $$J(x) = \frac{1}{M}\sum_{m=1}^{M} j(x, m)$$

where j(x,m) is a result of a processing in which a value obtained by multiplying a random number noise N(x, m) of 1 to 0 by the noise strength K is added to the input signal I(x,m) and further binarized, M indicates the number of the processing among which the random number noises are different and m indicates one of the plurality processing, and
the noise strength setting step sets the noise strength K based on a function of a correlation coefficient and the noise strength K:
the correlation coefficient showing a correlation between the result of a case where each of the plurality of input signals I(x) is subjected to the predetermined stochastic resonance processing and the detection target data.

* * * * *